(12) United States Patent
Kim et al.

(10) Patent No.: US 10,558,836 B2
(45) Date of Patent: Feb. 11, 2020

(54) SENSOR PIXEL, FINGERPRINT SENSOR, AND METHOD FOR DRIVING THE SAME

(71) Applicant: Samsung Display Co., Ltd., Yongin-si, Gyeonggi-do (KR)

(72) Inventors: Ki Seo Kim, Suwon-si (KR);
Jae-Kyoung Kim, Hwaseong-si (KR);
Byung Han Yoo, Suwon-si (KR)

(73) Assignee: Samsung Display Co., Ltd. (KR)

( * ) Notice: Subject to any disclaimer, the term of this patent is extended or adjusted under 35 U.S.C. 154(b) by 204 days.

(21) Appl. No.: 15/875,188

(22) Filed: Jan. 19, 2018

(65) Prior Publication Data

US 2019/0012504 A1 Jan. 10, 2019

(30) Foreign Application Priority Data

Jul. 5, 2017 (KR) .................. 10-2017-0085461

(51) Int. Cl.
*G06K 9/00* (2006.01)
*G06K 9/40* (2006.01)

(52) U.S. Cl.
CPC ......... *G06K 9/0002* (2013.01); *G06K 9/0008* (2013.01); *G06K 9/40* (2013.01)

(58) Field of Classification Search
CPC ....... G06K 9/0002; G06K 9/40; G06K 9/0008
See application file for complete search history.

(56) References Cited

U.S. PATENT DOCUMENTS 8,669,843 B2   3/2014  Chen
2012/0085822 A1  4/2012  Setlak et al.
2013/0287274 A1  10/2013  Shi et al.
2014/0266262 A1  9/2014  Taghibakhsh
2016/0253541 A1  9/2016  Yang et al.
2017/0103706 A1  4/2017  Yang et al.
2017/0277931 A1*  9/2017  Uehara ................ G02F 1/1368
2017/0336909 A1*  11/2017  Song .................... G06F 3/0416
2017/0351364 A1  12/2017  Kim et al.

FOREIGN PATENT DOCUMENTS

KR       10-0552451      2/2006
KR       10-1459982      11/2014
KR    10-2017-0042532 A   4/2017

OTHER PUBLICATIONS

Extended European Search Report dated Nov. 12, 2018, of the corresponding European Patent Application No. 18181710.7.

* cited by examiner

*Primary Examiner* — Phuoc Tran
(74) *Attorney, Agent, or Firm* — Innovation Counsel LLP

(57) ABSTRACT

A sensor pixel includes: a reference capacitor including a first end connected to a driving signal line and a second end connected to a first node; a touch capacitor including one electrode connected to the first node, wherein capacitance of the touch capacitor changes by touching of an external object; a first transistor including a first end connected to an initialization voltage line, a second end connected to the first node, and a control end connected to an initialization line; a second transistor including a first end for receiving a common voltage, a second end for outputting a current generated based on the common voltage, and a control end connected to the first node; and a third transistor including a first end connected to the second end of the second transistor, a second end connected to a sensing line, and a control end connected to a scan line.

19 Claims, 17 Drawing Sheets

SENSOR PIXEL, FINGERPRINT SENSOR, AND METHOD FOR DRIVING THE SAME

CROSS-REFERENCE TO RELATED APPLICATION

This application claims priority to and the benefit of Korean Patent Application No. 10-2017-0085461 filed in the Korean Intellectual Property Office on Jul. 5, 2017, the disclosure of which is incorporated herein by reference in its entirety.

BACKGROUND

(a) Field

The present disclosure relates to a sensor pixel, a fingerprint sensor, and a driving method thereof.

(b) Description of the Related Art

As various terminals and wearable devices have been recently developed, various functions utilizing personal information such as finance or security are provided, and the importance of security verification increases.

A verification technique by biometrics verifies a user by using fingerprints, irises, voice, face, and blood vessels. The biometric characteristics used for verification are unique to each person without having inconvenience in possession. In addition, there is less risk of illegal uses or imitation because the biometric characteristics are not easily changed for life.

Particularly, a fingerprint verifying method is gradually becoming commercially available due to its convenience, security, and economic feasibility. In response to a user's direct or indirect contacts of his/her finger, a fingerprint sensor recognizes a fingerprint image of the finger and capture a fingerprint pattern from the fingerprint image.

The above information disclosed in this Background section is only for enhancement of understanding of the background of the present disclosure, and therefore it may contain information that does not form the prior art that is already known to a person of ordinary skill in the art.

SUMMARY

The exemplary embodiments have been made in an effort to provide a fingerprint sensor for removing noise, and a driving method thereof.

The exemplary embodiments have been made in another effort to provide a fingerprint sensor with a large area.

An exemplary embodiment of the present disclosure provides a fingerprint sensor including: a plurality of scan lines; a plurality of driving signal lines; a plurality of sensing lines; a plurality of initialization lines; an initialization voltage line for supplying an initialization voltage; a common voltage line for supplying a common voltage; and a plurality of sensor pixels, wherein each of the sensor pixels includes: a reference capacitor including a first end connected to a driving signal line of the driving signal lines and a second end connected to a first node; a touch capacitor including one electrode connected to the first node, wherein capacitance of the touch capacitor changes by touching of an external object; a first transistor including a first end connected to the initialization voltage line, a second end connected to the first node, and a control end connected to an initialization line of the initialization lines; a second transistor including a first end for receiving the common voltage, a second end for outputting a current generated based on the common voltage, and a control end connected to the first node; and a third transistor including a first end connected to the second end of the second transistor, a second end connected to a sensing line of the sensing lines, and a control end connected to a scan line of the scan lines.

The fingerprint sensor may further include: a plurality of switching lines; and a switching element including a first end connected to a sensing line of the sensing lines, a second end for transmitting the current, and a control end connected to a switching line of the switching lines.

Each of the sensor pixels may further include: a fourth transistor including a first end connected to the common voltage line; a second end connected to the first end of the second transistor; and a control end connected to the scan line.

The fingerprint sensor may further include: a scan driver for supplying a plurality of scan signals to the scan lines; a sensing driver for supplying a plurality of driving signals to the driving signal lines, and receiving currents that are output by the sensor pixels through the plurality of sensing lines; and a sensing controller for controlling the scan driver and the sensing driver to receive a first current from a first sensor pixel connected to a first scan line by supplying a first scan signal to the first scan line for a first period, and receive a second current from the first sensor pixel by supplying a second scan signal to the first scan line for a second period after the first period and supplying a driving signal to at least one of the driving signal lines.

The scan driver may further supply a plurality of initialization signals to the initialization lines, and the sensing controller may supply the initialization voltage to the first sensor pixel by supplying the initialization signal to one of the initialization lines for the first period.

The sensing controller may control the sensing driver to supply an enable-level voltage to at least one of the switching lines for the first period and the second period.

The sensing driver may subtract the first current from the second current, and may output a resultant value to the sensing controller as sensing data.

The sensing driver may output the first current to the sensing controller as first sensing data corresponding to a noise signal, and the second current as second sensing data, and the sensing controller may generate a value from the second sensing data by subtracting the first sensing data.

The fingerprint sensor may further include a plurality of switching lines, wherein the sensor pixel may further include a fifth transistor including a first end connected to the second end of the third transistor, a second end connected to the sensing line, and a control end connected to a switching line of the switching lines.

Another embodiment of the present disclosure provides a method for driving a fingerprint sensor including a plurality of scan lines, a plurality of driving signal lines, a plurality of sensing lines, a common voltage line for supplying a common voltage, and each of a plurality of sensor pixels being connected to a scan line of the scan lines, a driving signal line of the driving signal lines, a sensing line of the sensing lines, and the common voltage line, and outputting a current generated based on the common voltage to the sensing line while a scan signal is supplied from the scan line, the method for driving the fingerprint sensor including: receiving a first current from a first sensor pixel connected to the scan line by supplying a first scan signal to the scan line of the scan lines for a first period; and receiving a second current from the first sensor pixel by supplying a second scan signal to the scan line and supplying a driving signal to at least one driving signal line of the driving signal lines for a second period after the first period.

The fingerprint sensor may further include a plurality of initialization lines connected to the sensor pixels and an initialization voltage line for supplying an initialization voltage to the sensor pixels, and the receiving of the first current may include: supplying the initialization voltage to the first sensor pixel by supplying an initialization signal to one of the initialization lines for the first period.

The fingerprint sensor may further include a plurality of switching elements, wherein each of the switching elements includes a first end connected to a sensing line of the sensing lines, a second end connected to the sensing driver, and a control end connected to a switching line to which a switching signal from the sensing driver is applied, wherein the receiving of the first current and the receiving of the second current may further respectively include supplying an enable-level voltage to at least one of the switching lines.

The fingerprint sensor may further include switching elements, wherein each of the switching elements includes a first end connected to the sensing line of the plurality of sensing lines, a second end connected to the sensing driver, and a control end connected to a switching line to which a switching signal from the sensing driver is applied, and the receiving of the first current and the receiving of the second current respectively include supplying an enable-level voltage to one of the switching lines.

The method may further include, after receiving the second current, subtracting the first current from the second current and outputting a resultant current as sensing data.

The method may further include, after receiving the first current, outputting the first current as first sensing data corresponding to a noise signal, and after receiving the second current, outputting the second current as second sensing data.

The method may further include outputting a value from the second sensing data by subtracting the first sensing data.

Yet another embodiment of the present disclosure provides a sensor pixel including: a reference capacitor including a first end connected to a driving signal line and a second end connected to a first node; a touch capacitor including one electrode connected to the first node, wherein capacitance of the touch capacitor changes by touching of an external object; a first transistor including a first end connected to an initialization voltage line, a second end connected to the first node, and a control end connected to an initialization line; a second transistor including a first end for receiving a common voltage, a second end for outputting a current generated based on the common voltage, and a control end connected to the first node and a third transistor including a first end connected to the second end of the second transistor, a second end connected to a sensing line, and a control end connected to a scan line.

The sensor pixel may further include a fourth transistor including a first end connected to a common voltage line for supplying the common voltage, a second end connected to the first end of the second transistor, and a control end connected to the scan line.

The sensor pixel may further include a fifth transistor including a first end connected to the second end of the third transistor, a second end connected to the sensing line, and a control end connected to a switching line.

According to the exemplary embodiments, the noise-reduced fingerprint pattern may be acquired.

BRIEF DESCRIPTION OF THE DRAWINGS

FIG. 3 and FIGS. 4A, 4B and 4C show a method for driving a fingerprint sensor in a first fingerprint sensing mode.

FIG. 5 and FIGS. 6A, 6B and 6C show a method for driving a fingerprint sensor in a second fingerprint sensing mode.

DETAILED DESCRIPTION OF THE EMBODIMENTS

Figure 1:
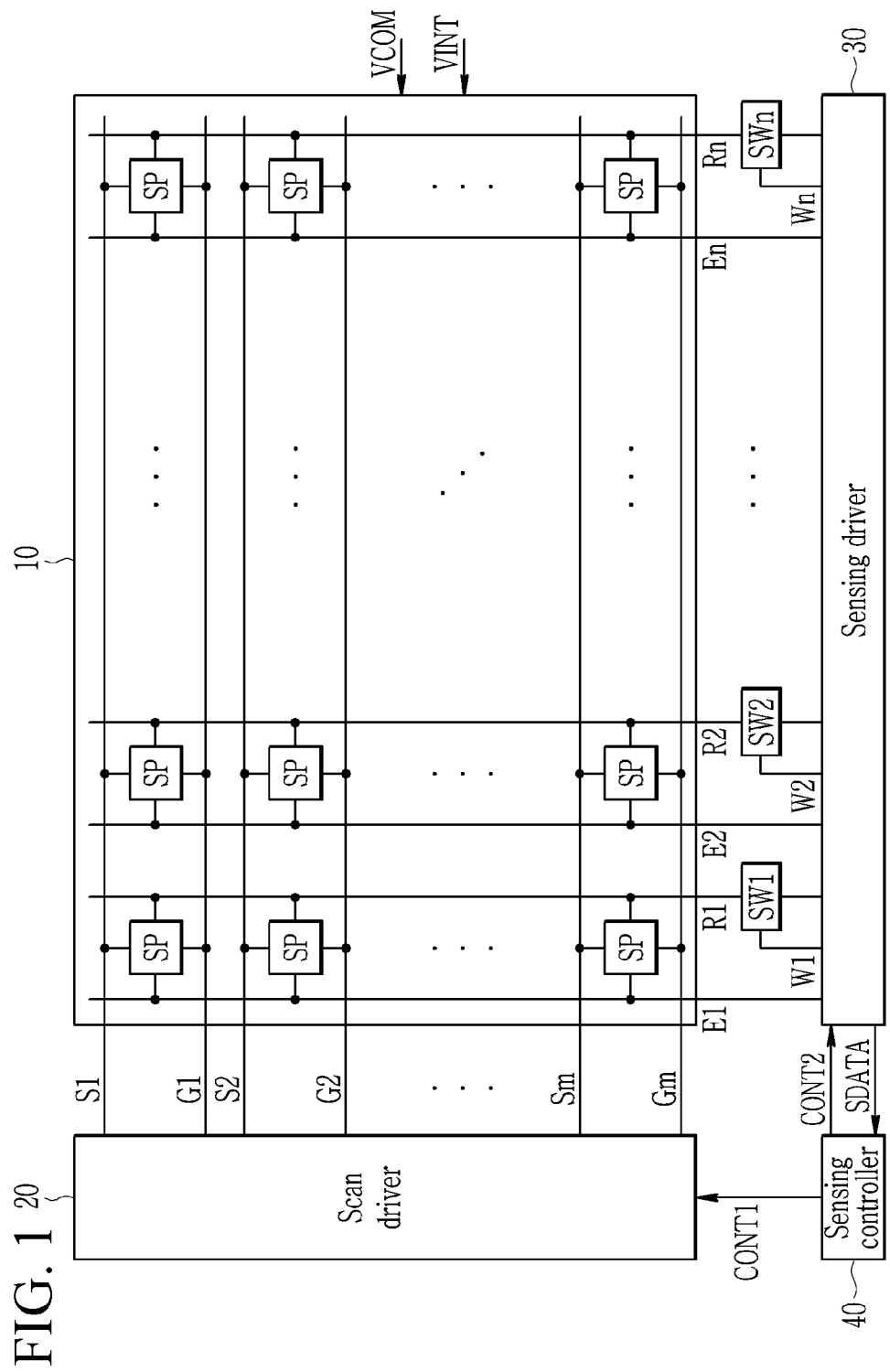
FIG. 1 shows a block diagram of a fingerprint sensor according to an exemplary embodiment of the present disclosure.

The present disclosure will be described more fully hereinafter with reference to the accompanying drawings, in which exemplary embodiments are shown. As those skilled in the art would realize, the described embodiments may be modified in various different ways, without departing from the spirit or scope of the present disclosure.

Accordingly, the drawings and description are to be regarded as illustrative in nature and not restrictive, and like reference numerals designate like elements throughout the specification.

FIG. 1 shows a block diagram of a fingerprint sensor according to an exemplary embodiment of the present disclosure.

Referring to FIG. 1, the fingerprint sensor includes a fingerprint sensing unit 10, a scan driver 20, a sensing driver 30, and a sensing controller 40.

The fingerprint sensing unit 10 includes initialization lines (S1-Sm), scan lines (G1-Gm), driving signal lines (E1-En), sensing lines (R1-Rn), and sensor pixels (SP) connected to the initialization lines (S1-Sm), the scan lines (G1-Gm), the driving signal lines (E1-En), and the sensing lines (R1-Rn) and substantially arranged as a matrix. Although not shown in FIG. 1, the fingerprint sensing unit 10 may further include an initialization voltage line for transmitting an initialization voltage (VINT) and a common voltage line for transmitting a common voltage, and the sensor pixels (SP) may be connected to the common voltage line and the initialization voltage line. The initialization voltage may have a voltage value that is greater than that of the common voltage.

The initialization lines (S1-Sm) and the scan lines (G1-Gm) may generally extend in a first direction (e.g., a row direction), and the driving signal lines (E1-En) and the sensing lines (R1-Rn) may extend in a second direction (e.g., a column direction) that crosses the first direction.

Each of the sensor pixels (SP) may generate a sensing signal caused by a touch input according to a self-capacitance scheme. For example, when a driving signal is input to the sensor pixel (SP), a capacitor (not shown) of the sensor pixel (SP) is charged with a predetermined amount of charges depending on a touching state of an external object such as a finger, and a current corresponding to the stored amount of charges is output to the sensing lines (R1-Rn) as a sensing signal.

That is, when the driving signal (input signal) is input to the sensor pixel (SP), the amount of charges stored in the capacitor in the sensor pixel (SP) is different according to the touching of the external object, and the corresponding sensing signal (an output signal) is transmitted to the sensing driver 30 through the sensing lines (R1-Rn). The driving signals of the sensor pixels (SP) may be applied to the sensor pixel (SP) through the driving signal lines (E1-En).

The sensing controller 40 controls the scan driver 20 and the sensing driver 30. The sensing controller 40 may receive a fingerprint capturing request from an external application processor (not shown), or may receive a fingerprint sensing mode selection signal corresponding to the fingerprint capturing request.

For example, the fingerprint capturing request may be performed on an application processor or may be generated by a process. For example, when an online banking application is performed on the application processor, a fingerprint capturing request for verifying a user may be generated by an account reference process, an account transfer process, or a user log-in process, and the fingerprint capturing request may be transmitted to the sensing controller 40.

The fingerprint sensing mode may be different according to the process performed on the application processor, and the fingerprint capturing request may trigger the fingerprint sensing mode. The sensing controller 40 may receive a fingerprint capturing request and may be operable in the fingerprint sensing mode corresponding to the fingerprint capturing request. Alternatively, the sensing controller 40 may receive a fingerprint sensing mode selection signal for designating the fingerprint sensing mode corresponding to the fingerprint capturing request and may be operable in the designated fingerprint sensing mode. The sensing controller 40 may directly receive the fingerprint capturing request.

The fingerprint capturing request may correspond to one of a plurality of fingerprint sensing modes. For example, the fingerprint sensing mode may include a first fingerprint sensing mode for simultaneously receiving sensing signals from sensor pixels in one row, a second fingerprint sensing mode for receiving a sensing signal from one sensor pixel and receiving a sensing signal from another sensor pixel, and a third fingerprint sensing mode for receiving sensing signals from some sensor pixels.

The sensing controller 40 generates a scan control signal CONT1 and a sensing control signal CONT2 according to the fingerprint sensing mode, and transmits the same to the scan driver 20 and the sensing driver 30, respectively.

The scan driver 20 receives the scan control signal CONT1 from the sensing controller 40, generates a scan signal including an enable level voltage and a disable level voltage, and applies the same to the scan lines (G1-Gm). In addition, the scan driver 20 generates an initialization signal including an enable level voltage and a disable level voltage using the received scan control signal CONT1, and applies the same to the initialization lines (S1-Sm).

FIG. 1 shows the exemplary embodiment in which the scan driver 20 generates the scan signal and the initialization signal, but the present disclosure is not limited thereto. For example, the fingerprint sensor may further include an initialization driver for generating an initialization signal while the scan driver 20 generates the scan signal.

The sensing driver 30 receives the sensing control signal CONT2 from the sensing controller 40, generates driving signals including an enable level voltage and a disable level voltage, and applies the same to the driving signal lines (E1-En). In addition, the sensing driver 30 generates switching signals including an enable level voltage and a disable level voltage using the received sensing control signal CONT2, and applies the same to switching elements (SW1-SWn) through switching lines (W1-Wn).

The switching elements (SW1-SWn) may be provided outside of the fingerprint sensing unit 10 and may be connected to the sensing lines (R1-Rn). For example, the switching elements (SW1-SWn) may be provided in the sensing driver 30. Each of the switching elements (SW1-SWn) may be turned on by a switching signal to transmit the sensing signal provided through the corresponding sensing lines (R1-Rn) to the sensing driver 30.

The sensing driver 30 may generate sensing data based on the sensing signals. To generate sensing data (SDATA), the sensing driver 30 may include an integrator and an analog-digital converter (ADC). The sensing data (SDATA) may include fingerprint pattern information caused by the sensing signals generated by the sensor pixels (SP) to which the driving signals are input. The sensing data (SDATA) may be transmitted to the sensing controller 40 or an external application processor.

A method for sensing a fingerprint using the above-described fingerprint sensor according to a fingerprint sensing mode will now be described with reference to FIG. 2 to FIG. 6C.

Figure 2:
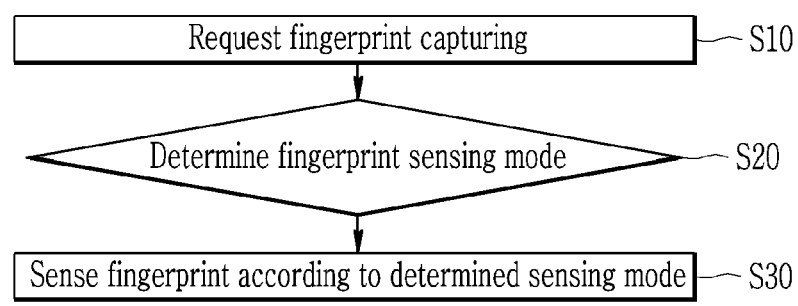
FIG. 2 shows a flowchart for sensing a fingerprint using a fingerprint sensor according to exemplary embodiments of the present disclosure.

FIG. 2 shows a flowchart for sensing a fingerprint using a fingerprint sensor according to exemplary embodiments of the present disclosure. Referring to FIG. 2, the sensing controller 40 receives a fingerprint capturing request (S10).

The sensing controller 40 determines a fingerprint sensing mode corresponding to the fingerprint capturing request (S20). The sensing controller 40 generates a scan control signal CONT1 and a sensing control signal CONT2 according to the determined fingerprint sensing mode, and senses the fingerprint (S30).

The first fingerprint sensing mode will now be described with reference to FIG. 3 to FIG. 4C.

Figure 3:
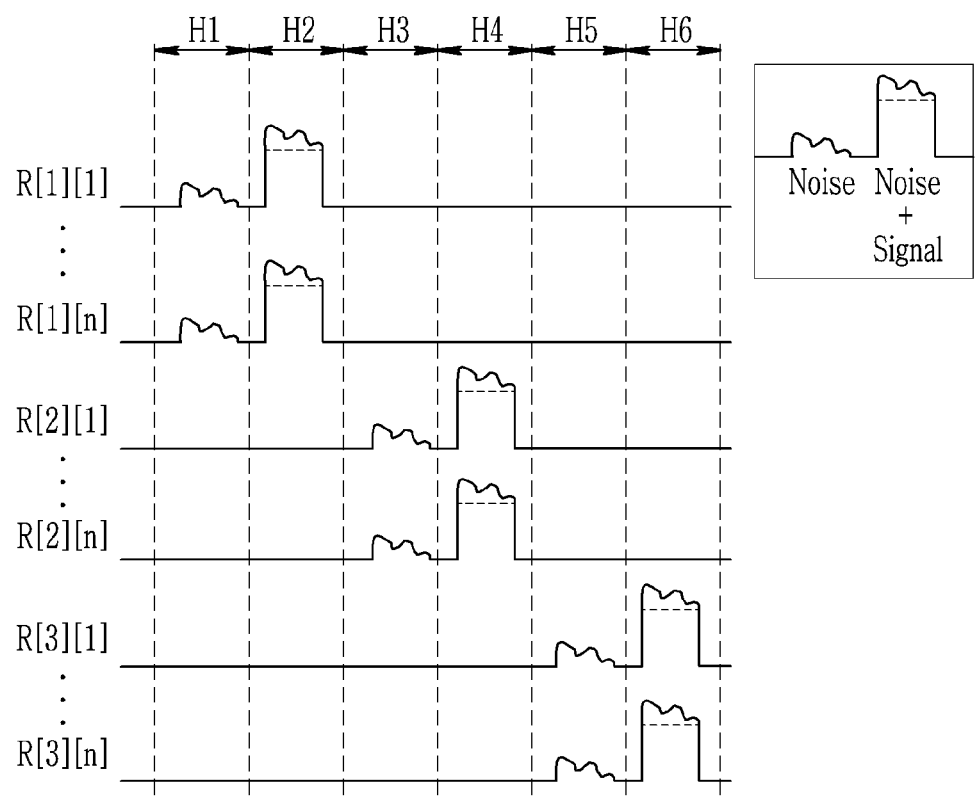
Figures 4A, 4B, 4C:
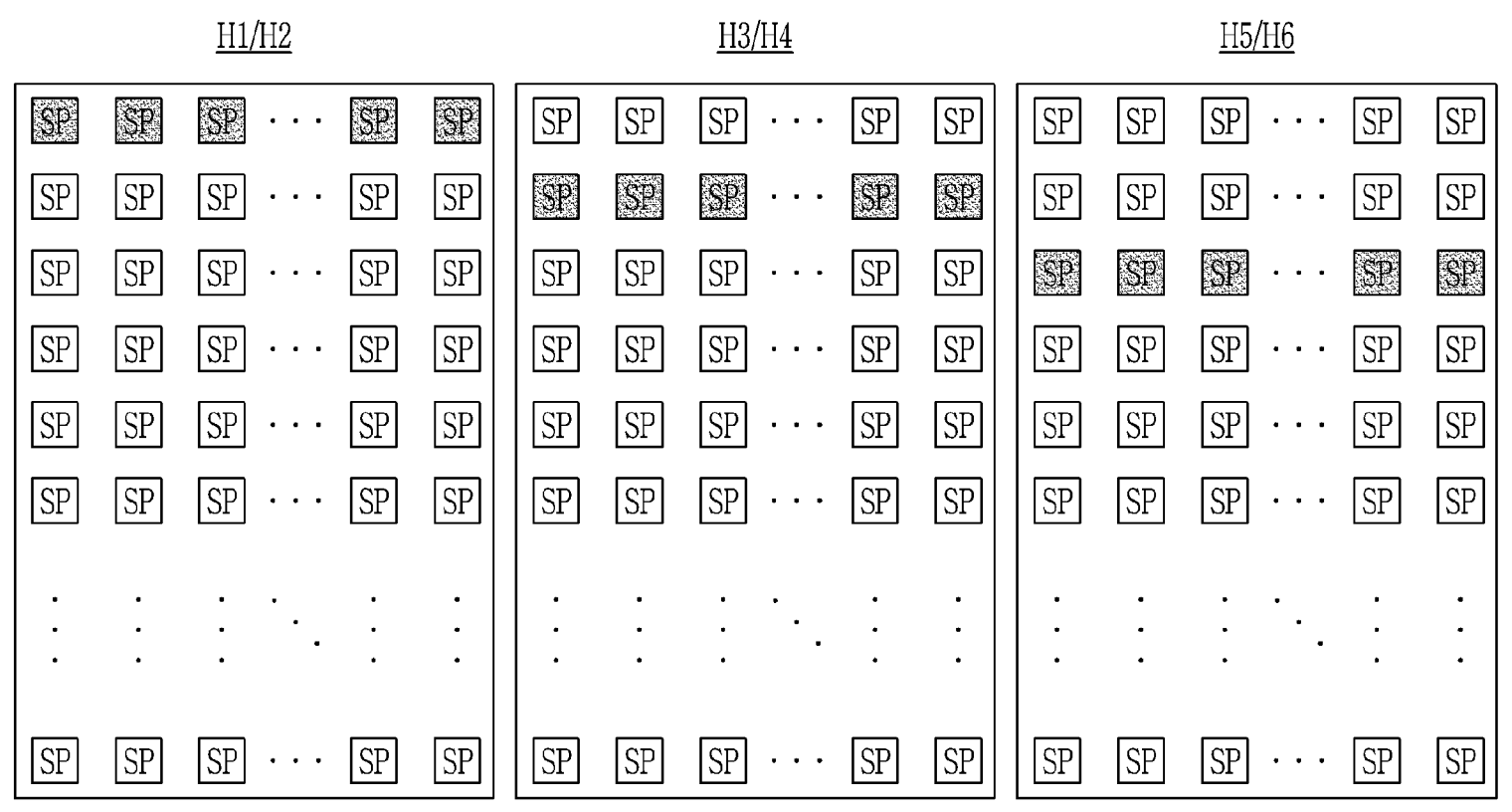

FIG. 3 to FIG. 4C show a method for driving a fingerprint sensor in a first fingerprint sensing mode.

Referring to FIG. 3, in the first fingerprint sensing mode, the sensing driver 30 may receive sensing signals from the sensor pixels in one row.

Referring to FIG. 4A, the sensing driver 30 receives noise signals (R[1][1]-R[1][n]) that are input by the first-row sensor pixels (SP) through the sensing lines (R1-Rn) for the first period H1. Subsequently, the sensing driver 30 receives sensing signals (R[1][1]-R[1][n]) that are input by the first-row sensor pixels (SP) through the sensing lines (R1-Rn) for the second period H2. The respective sensing signals that are input for the second period H2 include the noise signals of the respective sensor pixels (SP).

Referring to FIG. 4B, the sensing driver 30 receives noise signals (R[2][1]-R[2][n]) that are input by second-row sensor pixels (SP) through the sensing lines (R1-Rn) for the third period H3, and receives sensing signals (R[2][1]-R[2][n]) that are input by the second-row sensor pixels (SP)

through the sensing lines (R1-Rn) for the fourth period H4. In a like manner, referring to FIG. 4C, the sensing driver 30 receives noise signals (R[3][1]-R[3][n]) that are input by third-row sensor pixels (SP) through the sensing lines (R1-Rn) for the fifth period H5, and receives sensing signals (R[3][1]-R[3][n]) that are input by the third-row sensor pixels (SP) through the sensing lines (R1-Rn) for the sixth period H6.

The sensing controller 40 may receive the sensing signal without the noise signals. For example, the sensing controller 40 may control the scan driver 20 and the sensing driver 30 to receive the sensing signals from the first-row sensor pixels (SP) for the second period H2, the sensing signal from the second-row sensor pixels (SP) for the fourth period H4, and the sensing signals from the third-row sensor pixels (SP) for the sixth period H6 without receiving the noise signals for the first period H1, the third period H3, and the fifth period H5.

The second fingerprint sensing mode will now be described with reference to FIG. 5 and FIG. 6.

Figure 5:
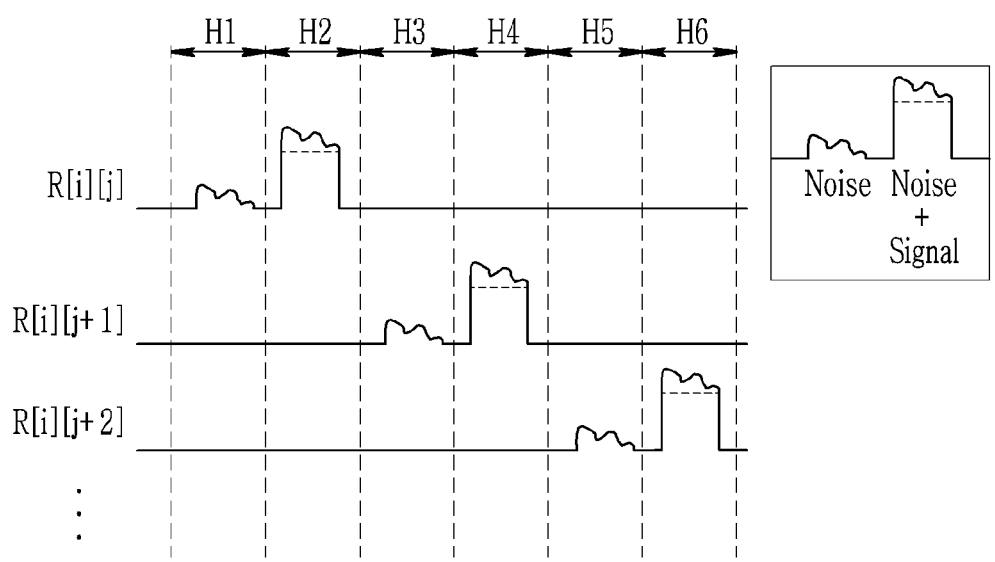

FIG. 5 and FIG. 6 show a method for driving a fingerprint sensor in a second fingerprint sensing mode.

Referring to FIG. 5, in the second fingerprint sensing mode, the sensing driver 30 may sequentially receive a noise signal and a sensing signal from one sensor pixel, and may sequentially receive a noise signal and a sensing signal from another sensor pixel.

Figures 6A, 6B, 6C:
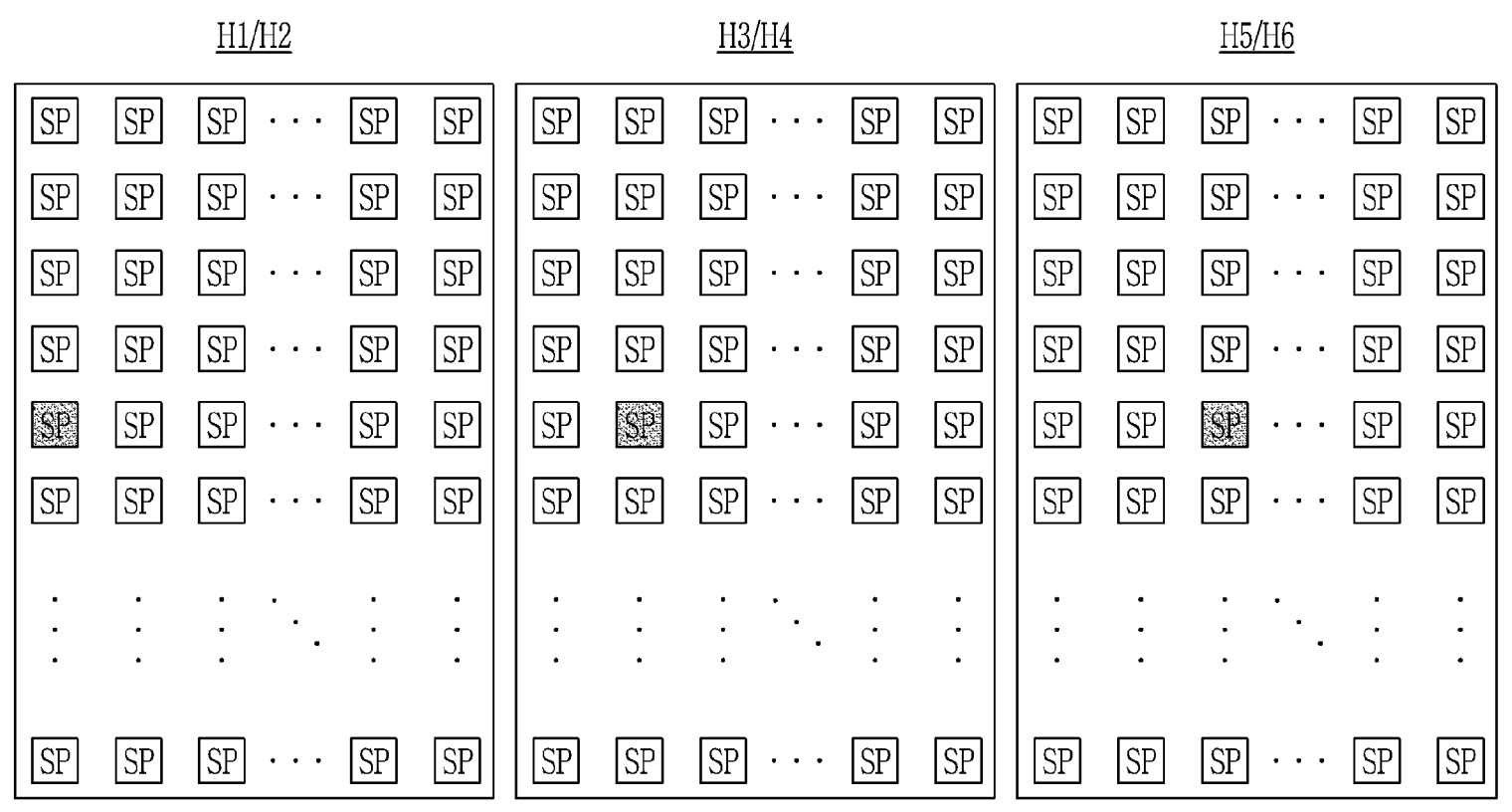

Referring to FIG. 6A, the sensing driver 30 receives a noise signal (R[i][j]) that is input by one sensor pixel (SP) provided in the i-th row and j-th column through the sensing line R1 for the first period H1. The sensing driver 30 receives a sensing signal (R[i][j]) that is input by the sensor pixel (SP) through the sensing line R1 for the second period H2. The sensing signal that is input for the second period H2 includes the noise signal of the sensor pixel (SP).

Referring to FIG. 6B, the sensing driver 30 receives a noise signal (R[i][j+1]) that is input by one sensor pixel (SP) provided in the i-th row and (j+1)-th column through the sensing line R2 for the third period H3, and receives the sensing signal (R[i][j+1]) that is input by the sensor pixel (SP) through the sensing line R2 for the fourth period H4. In a like manner, referring to FIG. 6C, the sensing driver 30 receives the noise signal (R[i][j+2]) that is input by the sensor pixel (SP) provided in the i-th row and (j+2)-th column through the sensing line R3 for the fifth period H5, and receives the sensing signal (R[i][j+2]) that is input by the sensor pixel (SP) through the sensing line R3 for the sixth period H6.

The sensing controller 40 may receive the sensing signals without noise signals in the second fingerprint sensing mode. For example, the sensing controller 40 may receive the sensing signal from one sensor pixel (SP) provided in the i-th row and j-th column for the second period H2, the sensing signal from one sensor pixel (SP) provided in the i-th row and (j+1)-th column for the fourth period H4, and the sensing signal from one sensor pixel (SP) provided in the i-th row and (j+2)-th column for the sixth period H6 without receiving the noise signals for the first period HI, the third period H3, and the fifth period H5.

Although not shown in the drawing, in the third fingerprint sensing mode, the sensing controller 40 may receive the sensing signal from some of a plurality of sensor pixels. For example, the sensing controller 40 may receive sensing signals from the sensor pixels provided in one region of the fingerprint sensing unit 10.

In the third fingerprint sensing mode, in a like manner of the first fingerprint sensing mode, the sensing controller 40 may apply driving signals to the first-row sensor pixels of the sensor pixels provided in one region to receive the sensing signals, and may apply driving signals to the second-row sensor pixels to receive the sensing signals.

In another way, in the third fingerprint sensing mode, in a like manner of the second fingerprint sensing mode, the sensing controller 40 may apply a driving signal to one sensor pixel provided in the first row and the first column of the sensor pixels provided in one region to receive the sensing signal, and may apply the driving signal to one sensor pixel provided in the first row and second column to receive the sensing signal.

Sensor pixels according to a first exemplary embodiment will now be described with reference to FIG. 7.

Figure 7:
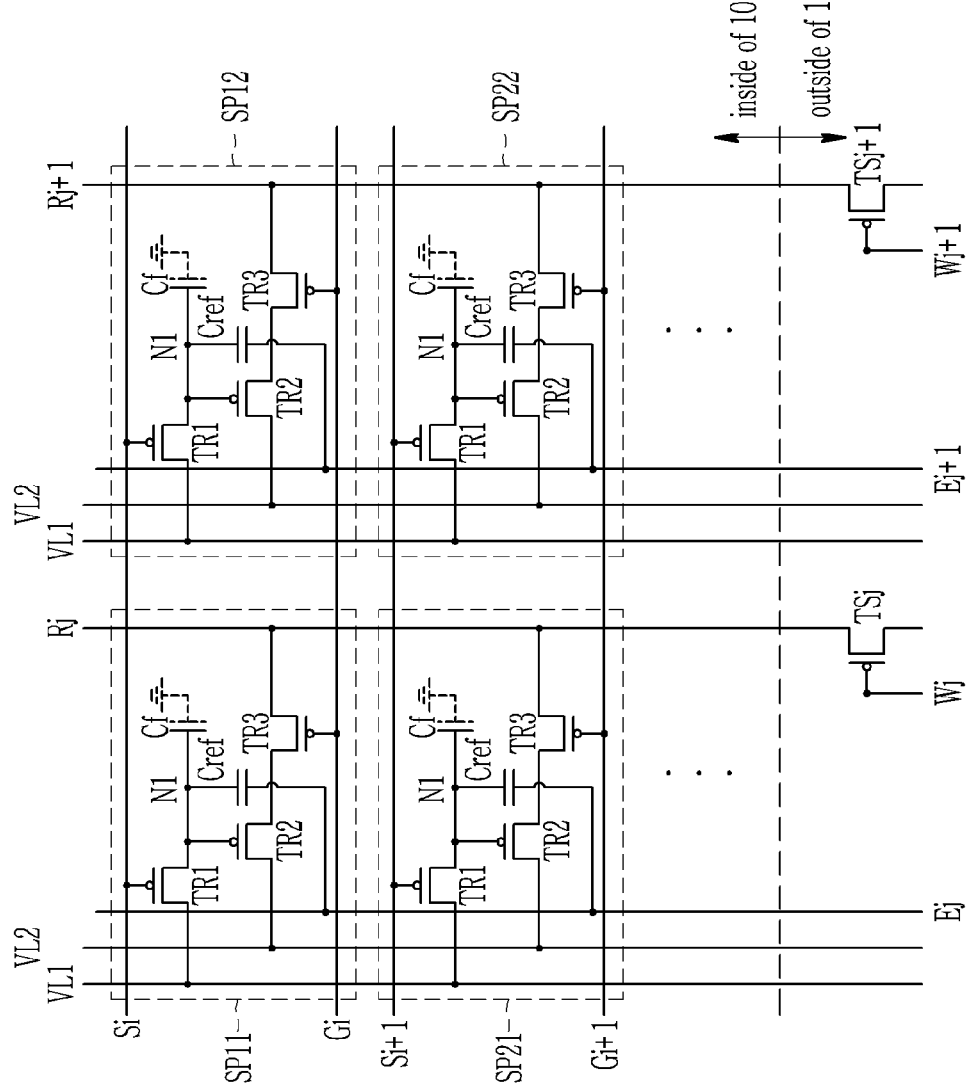
FIG. 7 shows sensor pixels of a fingerprint sensor of FIG. 1 according to a first exemplary embodiment.

FIG. 7 shows sensor pixels of a fingerprint sensor of FIG. 1 according to a first exemplary embodiment. Referring to FIG. 7, a plurality of sensor pixels SP11, SP12, SP21, and SP22 may be disposed on the fingerprint sensing unit 10.

The respective sensor pixels SP11, SP12, SP21, and SP22 may be connected to the corresponding initialization lines (Si, Si+1), the corresponding scan lines (Gi, Gi+1), the corresponding driving signal lines (Ej, Ej+1), the corresponding sensing lines (Rj, Rj+1), the initialization voltage line VL1, and the common voltage line VL2. For example, the sensor pixel SP11 is connected to the initialization line (Si), the scan line (Gi), the driving signal line (Ej), the sensing line (Rj), the initialization voltage line VL1, and the common voltage line VL2.

The sensor pixel SP11 includes a first transistor TR1 for initializing a first node N1, a reference capacitor (Cref) that is connected to the first node N1 and the driving signal line (Ej), a second transistor TR2 for outputting a current to the sensing line (Rj) according to a voltage at the first node N1, a third transistor TR3 for transmitting the current provided by the second transistor TR2 to the sensing line (Rj), and a touch capacitor Cf coupled in parallel to the reference capacitor (Cref) at the first node N1, of which capacitance is variable by a touch.

The first transistor TR1 includes a first end connected to the initialization voltage line VL1, a second end connected to the first node N1, and a control end connected to the initialization line (Si).

The second transistor TR2 includes a first end connected to the common voltage line VL2, a second end connected to a first end of the third transistor TR3, and a control end connected to the first node N1.

The third transistor TR3 includes a first end connected to the second end of the second transistor TR2, a second end connected to the sensing line (Rj), and a control end connected to the scan line (Gi).

The reference capacitor (Cref) includes a first end connected to the first node N1 and a second end connected to the driving signal line (Ej).

The touch capacitor Cf includes one electrode connected to the first node N1, and changes the voltage at the first node N1 according to a user's touch.

A plurality of switching elements (TSj, TSj+1) may be provided outside of the fingerprint sensing unit 10. For example, the switching element (TSj) is connected to the sensing line (Rj), and the switching element (TSj) includes a first end connected to the sensing line (Rj), a second end connected to the sensing driver 30 of FIG. 1, and a control end connected to the switching line (Wj). When current flows through the sensing line (Rj) that is connected to the first end of the switching element (TSj), and the switching element (TSj) is turned on, the current may be transmitted to the sensing driver 30 of FIG. 1 through the switching element (TSj).

An operation of sensor pixels in a first fingerprint sensing mode will now be described with reference to FIG. 8 to FIG. 12.

Figure 8:
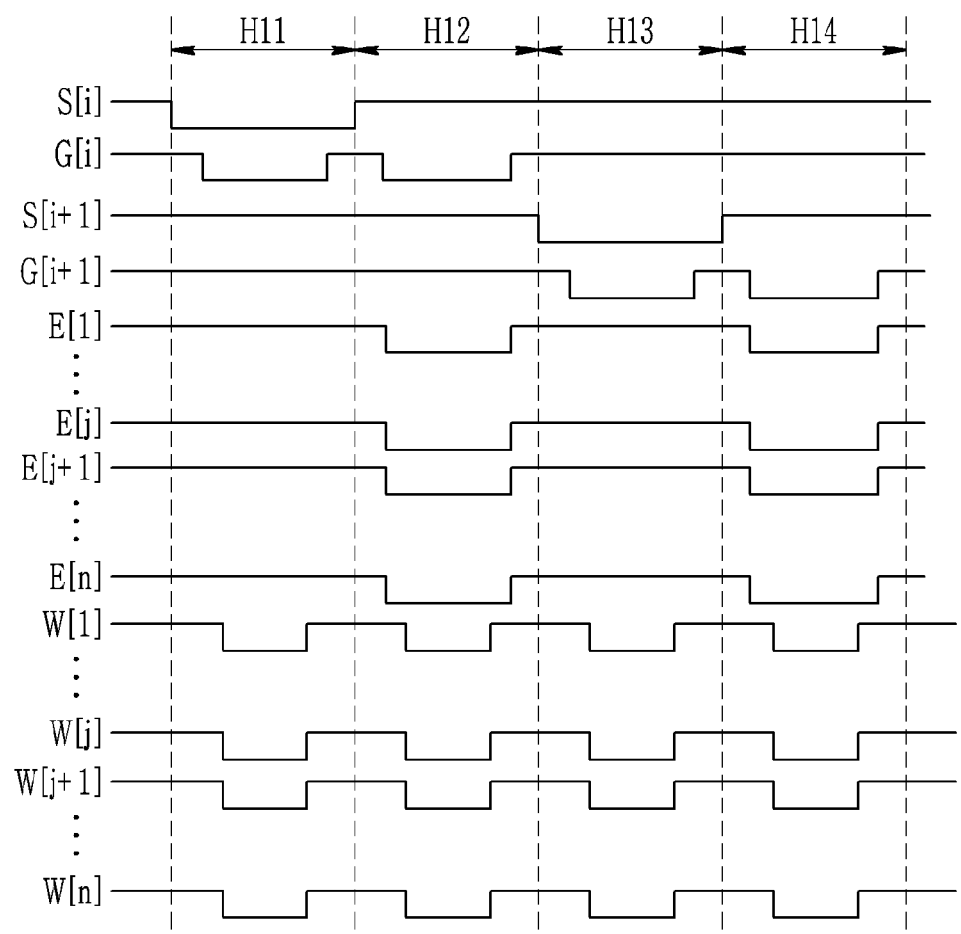
FIG. 8 shows a timing diagram of signals applied to sensor pixels in a first fingerprint sensing mode.

FIG. 8 shows a timing diagram of signals applied to sensor pixels in a first fingerprint sensing mode, and FIG. 9 to FIG. 12 show sensor pixels S11, S12, S21, and S22 operable by the signals shown in FIG. 8.

Figure 9:
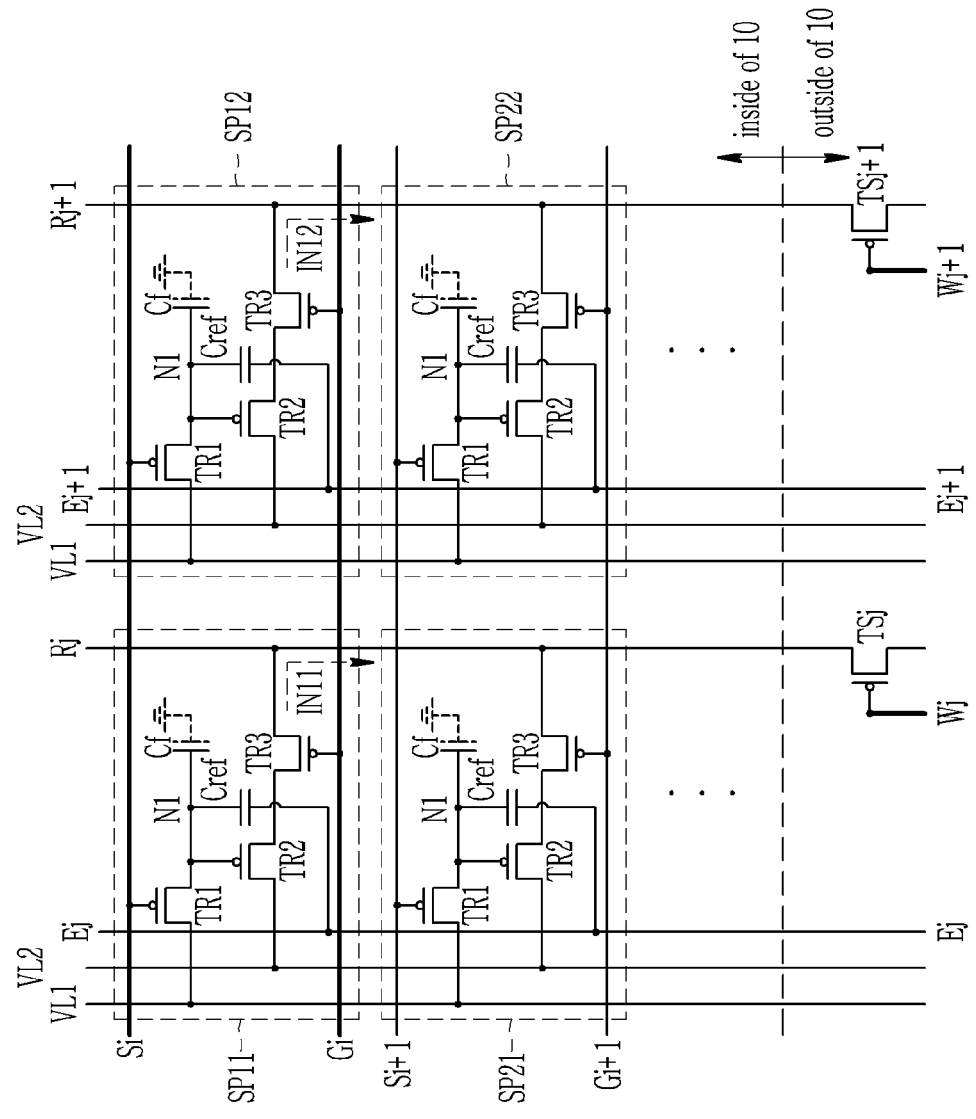
FIGS. 9, 10, 11 and 12 show sensor pixels operable by the signals shown in FIG. 8.

Referring to FIG. 8 and FIG. 9, an initialization signal (S[i]) is supplied with an enable-level voltage for the first period H11. The scan signal (G[i]) is supplied with an enable-level voltage in the first period H11 in which the initialization signal (S[i]) is supplied with the enable-level voltage. Further, the switching signals (W[1], ..., W[j], W[j+1], ..., W[n]) are supplied with an enable-level voltage in the first period H11 in which the scan signal (G[i]) is supplied with the enable-level voltage.

The enable-level initialization signal (S[i]) turns on the first transistor TR1 of the sensor pixels SP11 and SP12. The initialization voltage (VINT) is applied to the first node N1 of the sensor pixels SP11 and SP12 through the turned-on first transistor TR1 of the sensor pixels SP11 and SP12. The enable-level scan signal (G[i]) turns on the third transistor TR3 of the sensor pixels SP11 and SP12, and the enable-level switching signals (W[j], W[j+1]) turn on the switching elements (TSj, TSj+1).

Currents IN11 and IN12 may flow according to the initialization voltage (VINT) that is applied to the control end of the second transistor TR2 (or the first node N1) of the sensor pixels SP11 and SP12 and the common voltage (VCOM) that is applied to the first end of the second transistor TR2 of the sensor pixels SP11 and SP12. The currents IN11 and IN12 may be transmitted to the sensing driver 30 through the respective sensing lines (Rj, Rj+1). The sensing driver 30 may receive the current IN11 as a noise signal of the sensor pixel SP11, and may receive the current IN12 as a noise signal of the sensor pixel SP12.

The currents IN11 and IN12 may have different values depending on a threshold voltage (Vth) value that is unique to the second transistor TR2 included in the respective sensor pixels SP11 and SP12.

Figure 10:
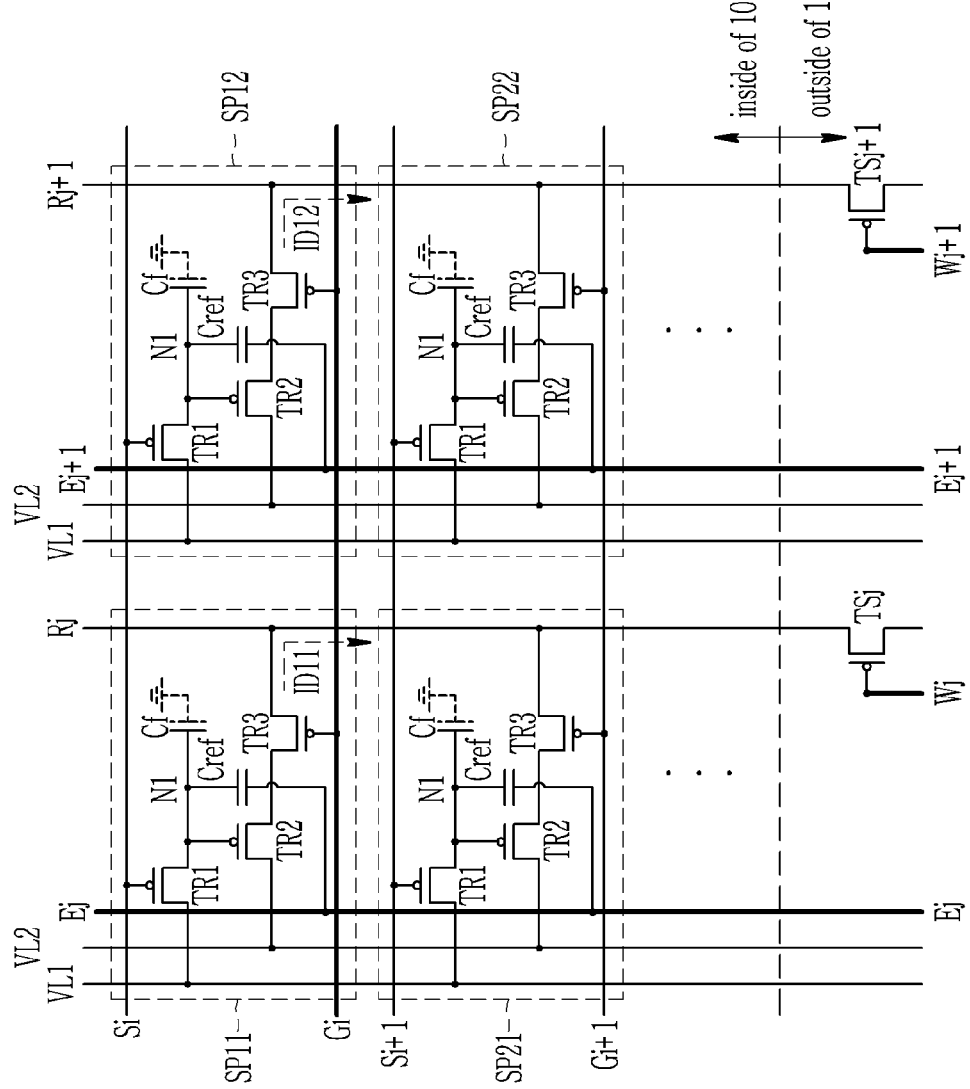

Referring to FIG. 8 and FIG. 10, the initialization signal (S[i]) is supplied with a disable-level voltage for the second period H12. The scan signal (G[i]) and the driving signal (E[1], ..., E[j], E[j+1], ..., E[n]) are supplied with enable-level voltages in the second period H12 in which the initialization signal (S[i]) is supplied with a disable-level voltage. Further, the switching signals (W[1], ..., W[j], W[j+1], ..., W[n]) are supplied with an enable-level voltage in the second period H12 in which the scan signal (G[i]) and the driving signals (E[1], ..., E[j], E[j+1], ..., E[n]) are supplied with the enable-level voltages.

The enable-level driving signals (E[j], E[j+1]) are then applied to a first end of the reference capacitor (Cref) of the sensor pixels SP11 and SP12, so the voltage at the first node N1 of the sensor pixels SP11 and SP12 becomes lower than in the first period H11 by a boosting effect of the reference capacitor (Cref).

In this instance, when there is a touch on the sensor pixels SP11 and SP12, the voltage at the first node N1 may be divided to the touch capacitor Cf that is coupled in parallel to the reference capacitor (Cref) of the sensor pixels SP11 and SP12. Therefore, the voltage at the first node N1 when a touch is provided is greater than the voltage at the first node N1 when there is no touch.

Further, the fingerprint of a user includes a ridge and a valley. A distance between one electrode of the touch capacitor Cf and the valley when the valley is touched may be longer than a distance between one electrode of the touch capacitor Cf and the ridge when the ridge is touched. Therefore, the capacitance of the touch capacitor Cf when the valley is touched may be smaller than the capacitance of the touch capacitor Cf when the ridge is touched.

In summary, the enable-level driving signals (E[j], E[j+1]) are applied to the first end of the reference capacitor (Cref), and the voltage at the first node N1 may have values in an increasing order of when there is no touch, when the valley is touched, and when the ridge is touched.

The scan signal (G[i]) turns on the third transistor TR3 of the sensor pixels SP11 and SP12, and the enable-level switching signals (W[j], W[j+1]) turn on the switching elements (TSj, TSj+1).

The currents ID11 and ID12 may flow according to the voltage at the control end of the second transistor TR2 (or at the first node N1) and the common voltage (VCOM) applied to the first end of the second transistor TR2. The currents ID11 and ID12 may be transmitted to the sensing driver 30 through the respective sensing lines (Rj, Rj+1).

The currents ID11 and ID12 may have values in a decreasing order of when there is no touch, when the valley is touched, and when the ridge is touched. Further, when the sensor pixels SP11 and SP12 are not touched, the currents ID11 and ID12 may have different values depending on the threshold voltage (Vth) that is unique to the second transistor TR2 included in the sensor pixels SP11 and SP12. This is identically applicable to a case when the ridge is touched or a case when the valley is touched.

The sensing driver 30 may receive the current ID11 as a sensing signal of the sensor pixel SP11, and may receive the current ID12 as a sensing signal of the sensor pixel SP12.

According to one embodiment, the sensing driver 30 may include a subtractor (not shown) for subtracting the noise signal that is input for the first period H11 from the sensing signal that is input for the second period H12. The sensing driver 30 may output the sensing signal from which the noise signal is removed to the sensing controller 40 as sensing data. The sensing controller 40 may determine a touching state and a ridge or valley's touching state by using the sensing data.

In another embodiment, the sensing driver 30 may output the noise signal or the sensing signal input for respective periods to the sensing controller 40 as sensing data, and the sensing controller 40 may perform an operation for subtracting the noise signal from the sensing signal that is included in the sensing data to determine the touching state and a ridge or valley's touching state.

In addition, the sensing controller 40 may output the sensing data to an external application processor, and the application processor may perform an operation using the sensing data, and may determine the touching state and a ridge or valley's touching state.

The fingerprint sensor may receive the noise signal and the sensing signal from the sensor pixels SP11 and SP12 in the i-th row in the first period H11 and the second period H12, respectively. In a like manner, the finger print sensor may further receive the noise signal and the sensing signal from the sensor pixels SP21 and SP22 in the (i+1)th row in the third period H13 and the fourth period H14, respectively.

Figure 11:
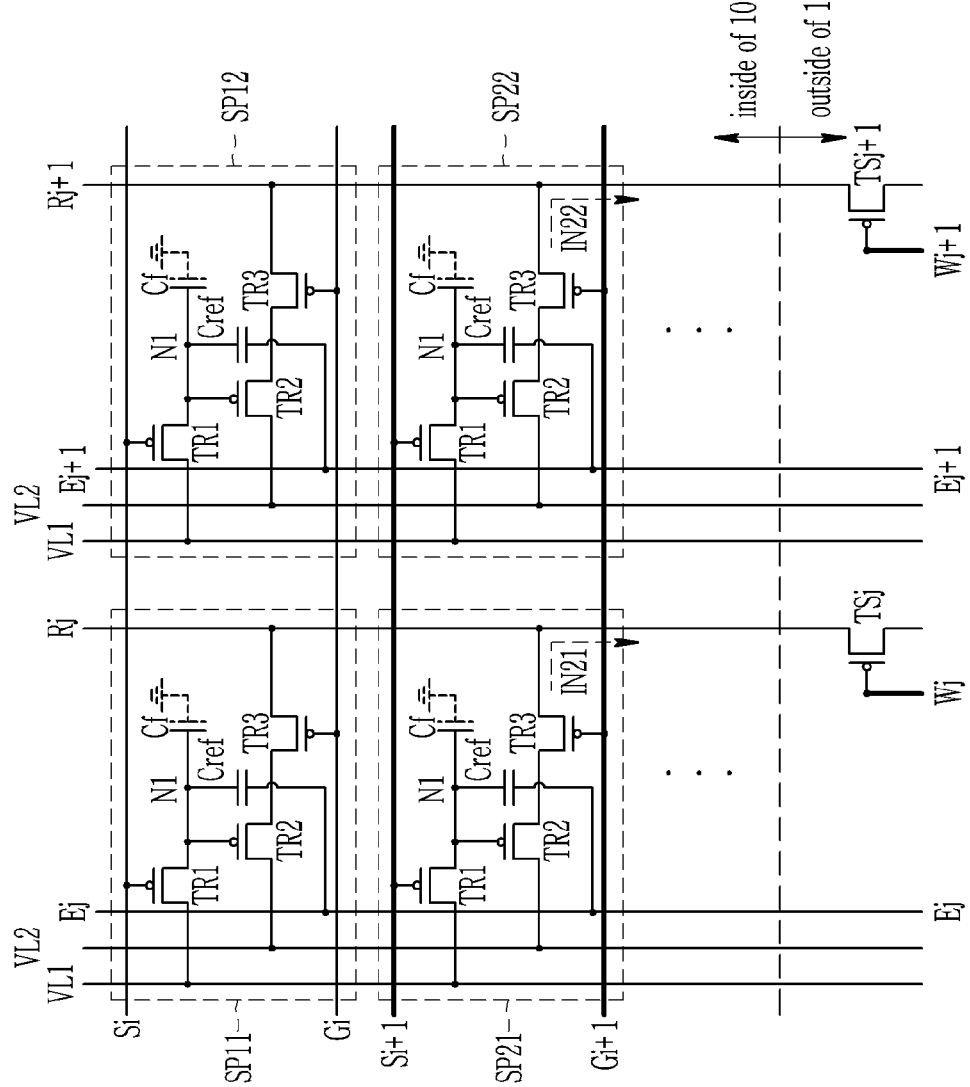
Figure 12:
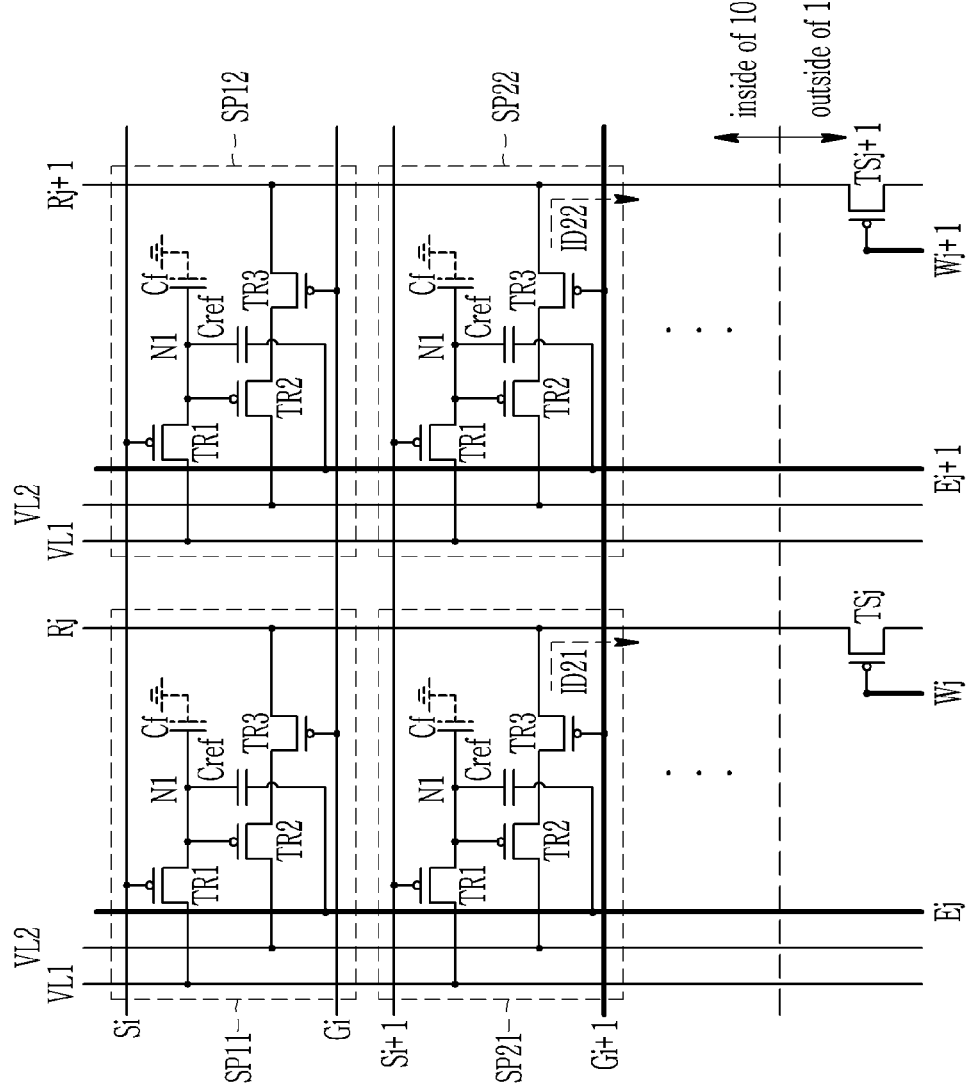

An operation of the sensor pixels SP21 and SP22 in the (i+1)th row shown in FIG. 11 and FIG. 12 is similar to an operation of the sensor pixels SP11 and SP12 in the i-th row shown in FIG. 9 and FIG. 10, and no detailed description thereof will be provided.

An operation of the sensor pixels in a second fingerprint sensing mode will now be described with reference to FIG. 7 and FIG. 13.

Figure 13:
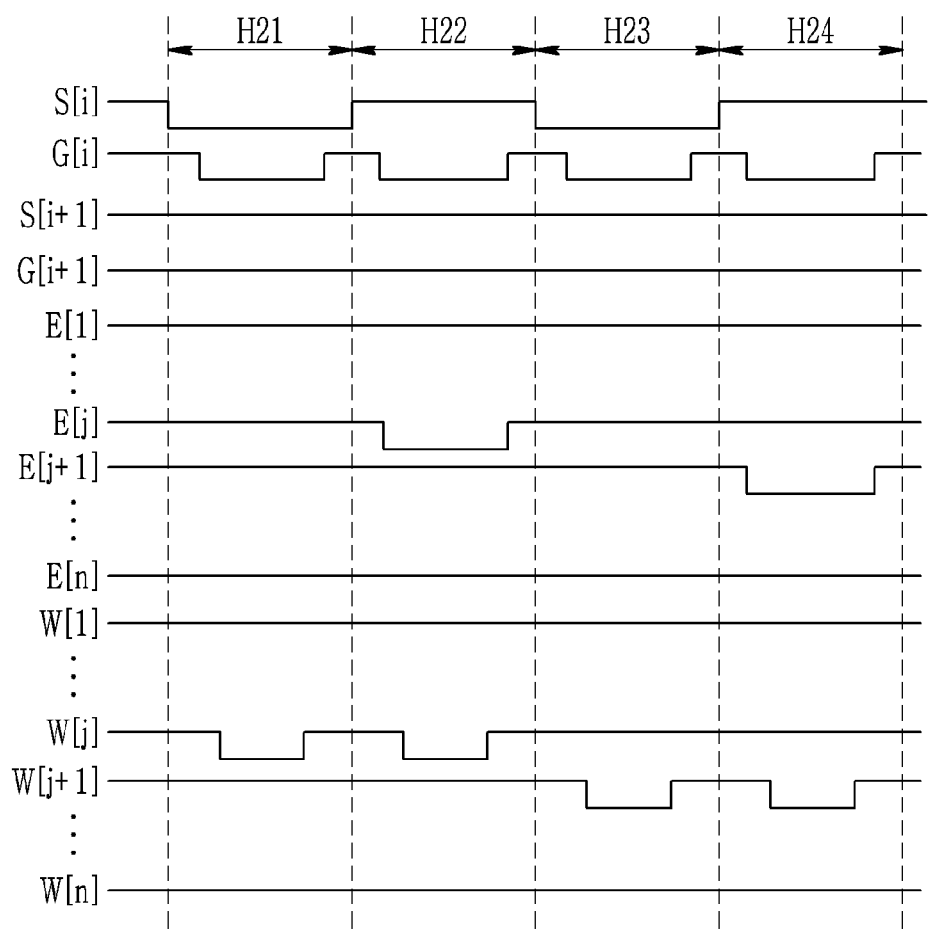
FIG. 13 shows a timing diagram of signals applied to sensor pixels in a second fingerprint sensing mode.

FIG. 13 shows a timing diagram of signals applied to sensor pixels in a second fingerprint sensing mode.

Referring to FIG. 13, the initialization signal (S[i]) is supplied with an enable-level voltage for a first period H21. The scan signal (G[i]) is supplied with an enable-level voltage in the first period H21 in which the initialization signal (S[i]) is supplied with the enable-level voltage. Further, the switching signal (W[j]) is supplied with an enable-level voltage in the first period H21 in which the scan signal (G[i]) is supplied with the enable-level voltage.

The enable-level initialization signal (S[i]) turns on the first transistor TR1 of the sensor pixels SP11 and SP12. An initialization voltage (VINT) is applied to the first node N1 of the sensor pixels SP11 and SP12 through the turned-on first transistor TR1 of the sensor pixels SP11 and SP12. The enable-level scan signal (G[i]) turns on the third transistor TR3 of the sensor pixels SP11 and SP12, and the enable-level switching signal (W[j]) turns on the switching element (TSj).

The current IN11 may flow according to the initialization voltage (VINT) that is applied to the control end of the second transistor TR2 (or the first node N1) of the sensor pixel SP11 and the common voltage (VCOM) that is applied to the first end of the second transistor TR2 of the sensor pixel SP11. The current IN11 may be transmitted to the sensing driver 30 through the sensing line (Rj). The sensing driver 30 may receive the current IN11 as a noise signal of the sensor pixel SP11.

The initialization signal (S[i]) is supplied with a disable-level voltage for a second period H22. The scan signal (G[i]) and the driving signal (E[j]) are supplied with an enable-level voltage in the second period H22 in which the initialization signal (S[i]) is supplied with the disable-level voltage. Further, the switching signal (W[j]) is supplied with an enable-level voltage in the second period H22 in which the scan signal (G[i]) and the driving signal (E[j]) are supplied with the enable-level voltages.

The enable-level driving signal (E[j]) is applied to the first end of the reference capacitor (Cref) of the sensor pixel SP11, so the voltage at the first node N1 of the sensor pixel SP11 becomes lower than that of the first period H21 according to the boosting effect of the reference capacitor (Cref).

In this instance, when the sensor pixel SP11 is touched, the voltage at the first node N1 may be divided to the touch capacitor Cf that is coupled in parallel to the reference capacitor (Cref) of the sensor pixel SP11. Therefore, the voltage at the first node N1 when there is a touch is greater than the voltage at the first node N1 when there is no touch.

The scan signal (G[i]) turns on the third transistor TR3 of the sensor pixel SP11, and the enable-level switching signal (W[j]) turns on the switching element (TSj).

The current ID11 may then flow according to the voltage at the control end of the second transistor TR2 (or the first node N1) of the sensor pixel SP11 and the common voltage (VCOM) that is applied to the first end of the second transistor TR2. The current ID11 may be transmitted to the sensing driver 30 through the sensing line (Rj).

The initialization signal (S[i]) is supplied with an enable-level voltage for a third period H23. The scan signal (G[i]) is supplied with an enable-level voltage in the third period H23 in which the initialization signal (S[i]) is supplied with the enable-level voltage. Further, the switching signal (W[j+1]) is supplies as an enable-level voltage in the third period H23 in which the scan signal (G[i]) is supplied with the enable-level voltage.

The current IN12 may flow according to the initialization voltage (VINT) that is applied to the control end of the second transistor TR2 (or the first node N1) of the sensor pixel SP12 and the common voltage (VCOM) that is applied to the first end of the second transistor TR2 of the sensor pixel SP12. The current IN12 may be transmitted to the sensing driver 30 through the sensing line (R[j+1]). The sensing driver 30 may receive the current IN12 as a noise signal of the sensor pixel SP12.

The initialization signal (S[i]) is supplied with a disable-level voltage for a fourth period H24. The scan signal (G[i]) and the driving signal (E[j+1]) are supplied with the enable-level voltages in the fourth period H24 in which the initialization signal (S[i]) is supplied with the disable-level voltage. Further, the switching signal (W[j+1]) is supplied with an enable-level voltage in the fourth period H24 in which the scan signal (G[i]) and the driving signal (E[j+1]) are supplied with the enable-level voltages.

An enable-level driving signal (E[j+1]) is applied to the first end of the reference capacitor (Cref) of the sensor pixel SP12, so the voltage at the first node N1 of the sensor pixel SP12 becomes lower than that of the third period H23 according to the boosting effect of the reference capacitor (Cref).

The current ID12 may flow according to the voltage at the control end of the second transistor TR2 (or the first node N1) of the sensor pixel SP12 and the common voltage (VCOM) that is applied to the first end of the second transistor TR2. The current ID12 may be transmitted to the sensing driver 30 through the sensing line Rj+1.

A sensor pixel according to a second exemplary embodiment will now be described with reference to FIG. 14.

Figure 14:
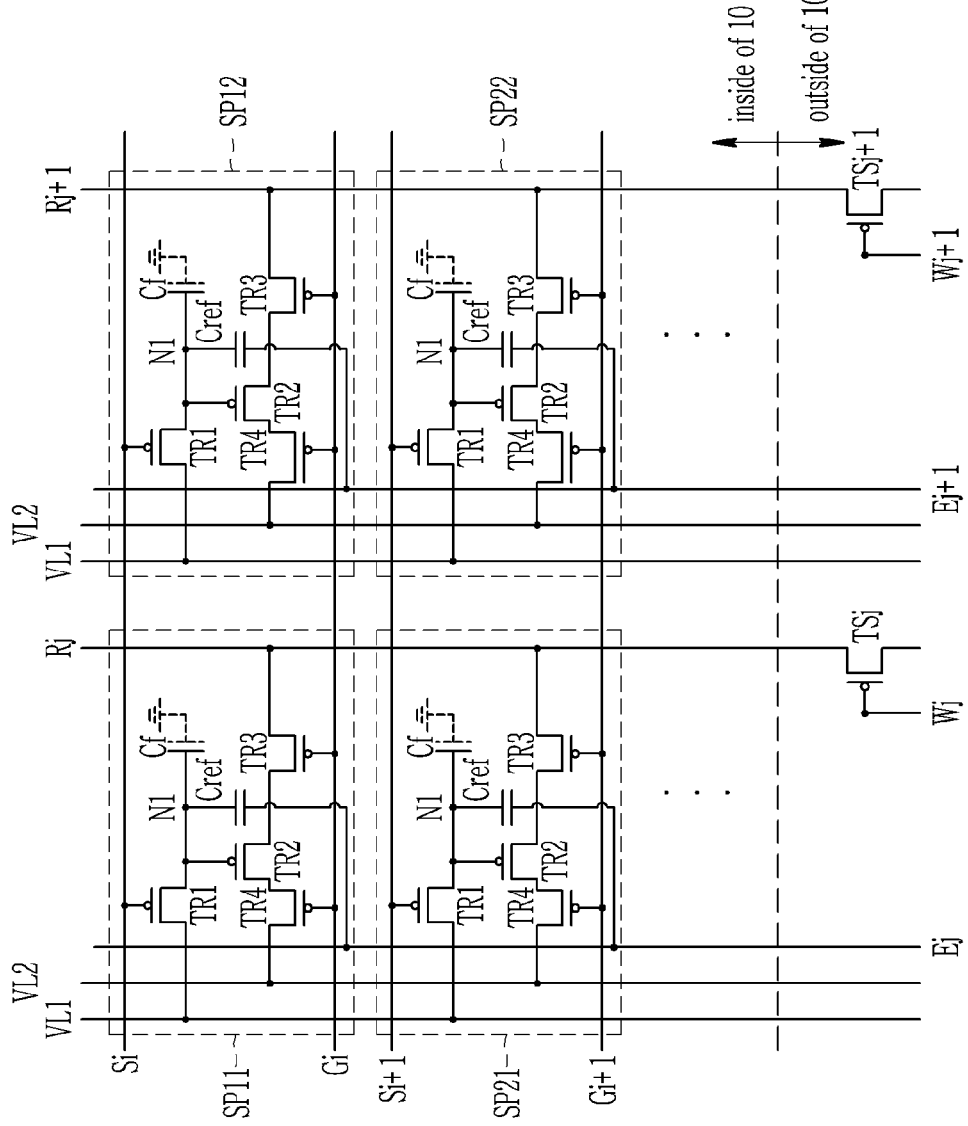
FIG. 14 shows sensor pixels of a fingerprint sensor of FIG. 1 according to a second exemplary embodiment.

FIG. 14 shows sensor pixels of a fingerprint sensor of FIG. 1 according to a second exemplary embodiment.

Referring to FIG. 14, a plurality of sensor pixels SP11, SP12, SP21, and SP22 may be disposed on the fingerprint sensing unit 10. The sensor pixels SP11, SP12, SP21, and SP22 shown in FIG. 14 further include a fourth transistor TR4 compared to the sensor pixel shown in FIG. 7.

The sensor pixel SP11 includes a first transistor TR1 for initializing a first node N1, a reference capacitor (Cref) that is connected to the first node N1 and the driving signal line (Ej), a second transistor TR2 for outputting a current to the sensing line (Rj) according to a voltage at the first node N1, a third transistor TR3 for transmitting the current provided by the second transistor TR2 to the sensing line (Rj), a fourth transistor TR4 for transmitting the common voltage (VCOM) to the second transistor TR2, and a touch capacitor Cf coupled in parallel to the reference capacitor (Cref) at the first node N1, of which capacitance changes according to a touch.

The first transistor TR1 includes a first end connected to the initialization voltage line VL1, a second end connected to the first node N1, and a control end connected to the initialization line (Si).

The second transistor TR2 includes a first end connected to a second end of the fourth transistor TR4, a second end connected to the first end of the third transistor TR3, and a control end connected to the first node N1.

The third transistor TR3 includes a first end connected to the second end of the second transistor TR2, a second end connected to the sensing line (Rj), and a control end connected to the scan line (Gi).

The fourth transistor TR4 includes a first end connected to the common voltage line VL2, the second end connected to the first end of the second transistor TR2, and a control end connected to the scan line (Gi).

The reference capacitor (Cref) includes a first end connected to the first node N1 and a second end connected to the driving signal line (Ej).

The touch capacitor Cf includes one electrode connected to the first node N1, and changes the voltage at the first node N1 according to a user's touch.

In a like manner of the sensor pixel of FIG. 7, a plurality of switching elements (TSj, TSj+1) may be provided outside of the fingerprint sensing unit 10. For example, the switching element (TSj) is connected to the sensing line (Rj), and the switching element (TSj) includes a first end connected to the sensing line (Rj), a second end connected to the sensing driver 30 of FIG. 1, and a control end connected to the switching line (Wj). When current flows through the sensing line (Rj) that is connected to the first end of the switching element (TSj), and the switching element (TSj) is turned on, the current may be transmitted to the sensing driver 30 of FIG. 1 through the switching element (TSj).

The method for driving a fingerprint sensor including sensor pixels of FIG. 14 is similar to the method for driving a fingerprint sensor including sensor pixels of FIG. 7. However, each of the sensor pixels SP11, SP12, SP21, and SP22 further include the fourth transistor TR4, thereby blocking the noise input by another sensor pixel through the common voltage line VL2.

A case in which the sensor pixel SP11 is not touched and the sensor pixel SP21 is touched in the second period H12 of FIG. 8 will now be described.

A potential of the user touching the sensor pixel SP21 may be different from the potential of the common voltage of the fingerprint sensor or a ground voltage of the fingerprint sensor, and the potential of the user touching may also have an alternating current (AC) characteristic.

Therefore, when the user's finger touches the touch capacitor Cf of the sensor pixel SP21, an AC voltage may be applied to the first end of the touch capacitor Cf. The potential at the first node N1 of the sensor pixel SP21 may be varied depending on the AC voltage. When the potential of the first node N1 changes, the potentials at the first end and the second end of the second transistor TR2 may be changed by parasitic capacitance (Cgs, Cgd, etc.) of the second transistor TR2 of the sensor pixel SP21.

When the fourth transistor TR4 is not connected between the common voltage line VL2 and the second transistor TR2, the potential of the common voltage line VL2 may be changed by the potential at the first end of the second transistor TR2. This may influence a value of the current output by the sensor pixel SP21.

However, when the turned-off fourth transistor TR4 is connected between the common voltage line VL2 and the second transistor TR2, the potential of the common voltage line VL2 may be hardly influenced when the potential of the first end of the second transistor TR2 changes. Therefore, in the second period H12, when the sensor pixel SP21 is touched, the value of the current output by the sensor pixel SP21 may not be influenced.

A fingerprint sensor according to another exemplary embodiment of the present disclosure will now be described with reference to FIG. 15 to FIG. 17.

Figure 15:
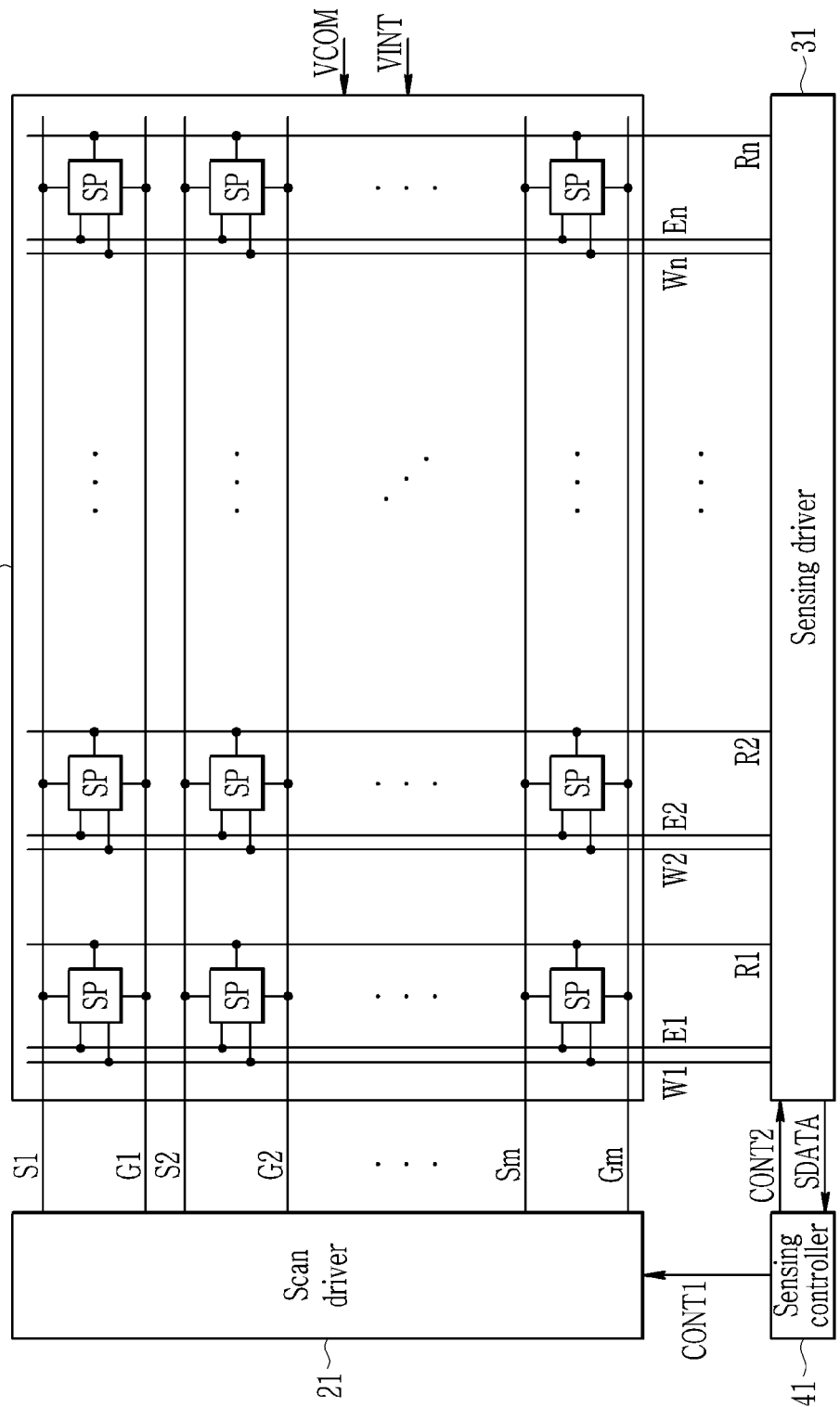
FIG. 15 shows a block diagram of a fingerprint sensor according to another exemplary embodiment of the present disclosure.
Figure 16:
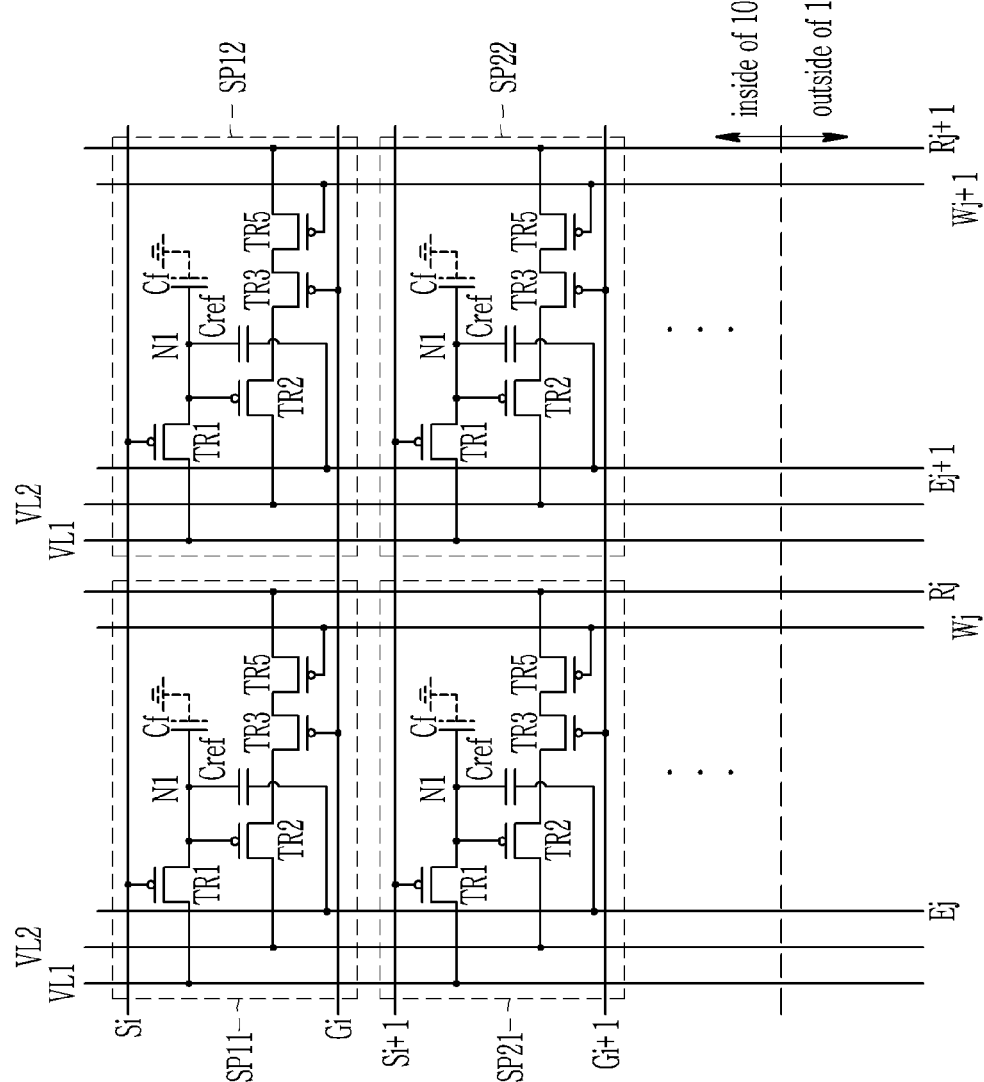
FIG. 16 and FIG. 17 show sensor pixels of a fingerprint sensor of FIG. 15 according to various exemplary embodiments.
Figure 17:
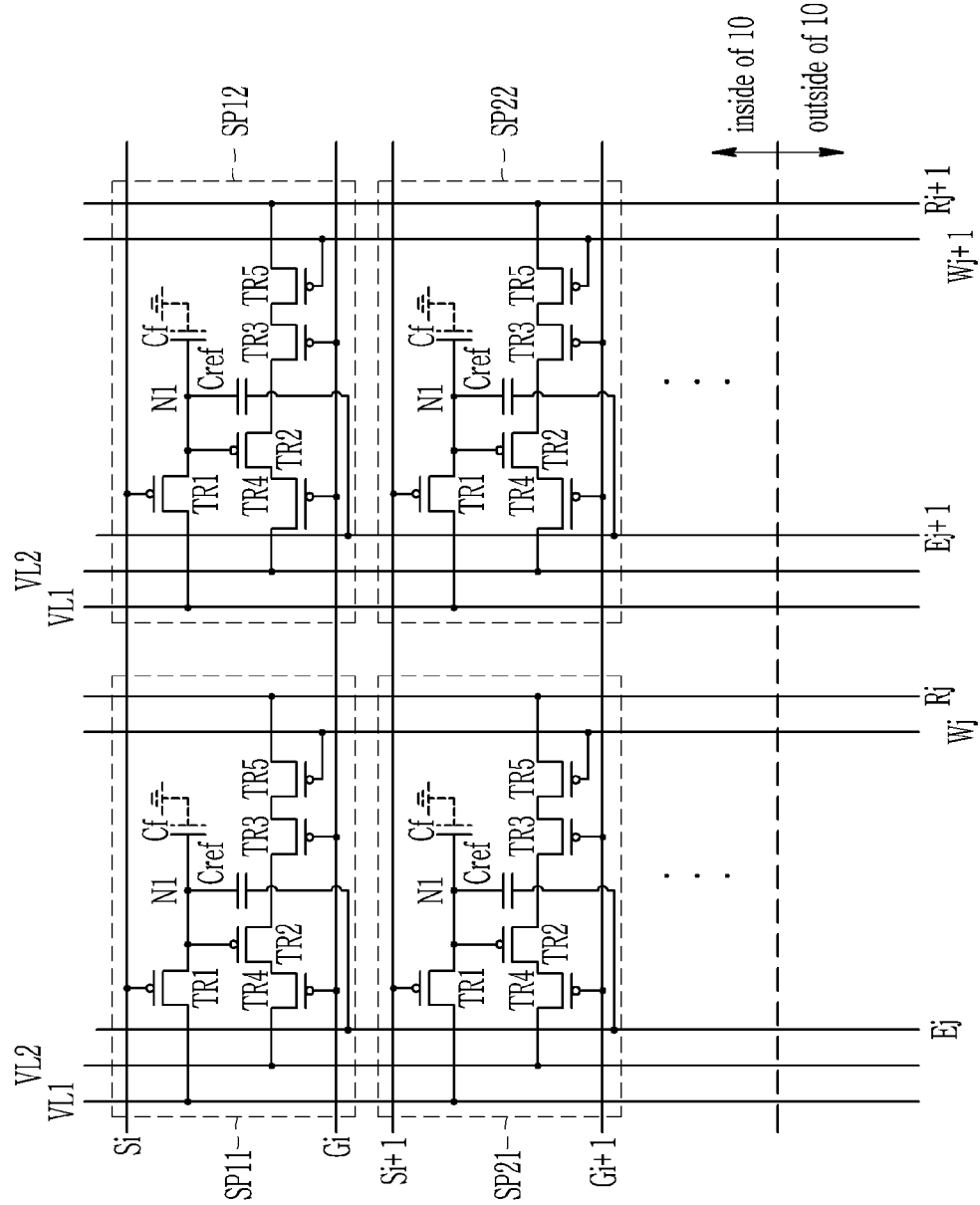

FIG. 15 shows a block diagram of a fingerprint sensor according to another exemplary embodiment of the present disclosure, and FIG. 16 and FIG. 17 show sensor pixels of a fingerprint sensor of FIG. 15 according to various exemplary embodiments.

Referring to FIG. 15, the fingerprint sensor includes a fingerprint sensing unit 11, a scan driver 21, a sensing driver 31, and a sensing controller 41.

Regarding the fingerprint sensor shown in FIG. 15, compared to the fingerprint sensor shown in FIG. 1, the switching lines (W1-Wn) extend in a second direction in the fingerprint sensing unit 11, and transistors corresponding to the switching elements may be provided in the respective sensor pixels (SP).

Referring to FIG. 16 and FIG. 17, a plurality of sensor pixels SP11, SP12, SP21, and SP22 may be disposed on the fingerprint sensing unit 11 of FIG. 15.

The sensor pixel SP11 includes a first transistor TR1 for initializing a first node N1, a reference capacitor (Cref) that is connected to the first node N1 and the driving signal line (Ej), a second transistor TR2 for outputting a current to the sensing line (Rj) according to the voltage at the first node N1, a third transistor TR3 for transmitting the current provided by the second transistor TR2, a fifth transistor TR5 for transmitting the current provided by the third transistor TR3 to the sensing line (Rj), and a touch capacitor Cf coupled in parallel to the reference capacitor (Cref) at the first node N1, of which capacitance changes by a touch.

The first transistor TR1 includes a first end connected to the initialization voltage line VL1, a second end connected to the first node N1, and a control end connected to the initialization line (Si).

The second transistor TR2 includes a first end connected to the common voltage line VL2, a second end connected to a first end of the third transistor TR3, and a control end connected to the first node N1.

The third transistor TR3 includes a first end connected to the second end of the second transistor TR2, a second end connected to a first end of the fifth transistor TR5, and a control end connected to the scan line (Gi).

The fifth transistor TR5 includes the first end connected to the second end of the third transistor TR3, a second end connected to the sensing line (Rj), and a control end connected to the switching line (Wj).

The reference capacitor (Cref) includes a first end connected to the first node N1 and a second end connected to the driving signal line (Ej).

The touch capacitor Cf includes one electrode connected to the first node N1, and changes the voltage at the first node N1 according to a user's touch.

The respective sensor pixels SP11, SP12, SP21, and SP22 respectively include a fifth transistor TR5 that is turned on according to a level of the switching signal.

The method for driving a fingerprint sensor including sensor pixels of FIG. 16 is similar to the method for driving a fingerprint sensor including sensor pixels of FIG. 7. An operation of the sensor pixels in a first fingerprint sensing mode will now be described with reference to FIG. 8.

The initialization signal (S[i]) is supplied with an enable-level voltage for the first period H11. The scan signal (G[i]) is supplied with an enable-level voltage in the first period H11 in which the initialization signal (S[i]) is supplied with the enable-level voltage. Further, the switching signals (W[1], ..., W[j], W[j+1], ..., W[n]) are supplied with an enable-level voltage in the first period H11 in which the scan signal (G[i]) is supplied with the enable-level voltage.

The enable-level initialization signal (S[i]) turns on the first transistor TR1 of the sensor pixels SP11 and SP12. The initialization voltage (VINT) is applied to the first node N1 of the sensor pixels SP11 and SP12 through the turned-on first transistor TR1 of the sensor pixels SP11 and SP12. The enable-level scan signal (G[i]) turns on the third transistor TR3 of the sensor pixels SP11 and SP12, and the enable-level switching signals (W[j], W[j+1]) turn on the fifth transistor TR5 of the sensor pixels SP11 and SP12.

Currents IN11 and IN12 may flow according to the initialization voltage (VINT) that is applied to the control end N1 of the second transistor TR2 (or the first node N1) of the sensor pixels SP11 and SP12 and the common voltage (VCOM) that is applied to the first end of the second transistor TR2 of the sensor pixels SP11 and SP12. The currents IN11 and IN12 may be transmitted to the sensing driver 31 of FIG. 15 through the respective sensing lines (Rj, Rj+1). The sensing driver 31 may receive the current IN11 as a noise signal of the sensor pixel SP11, and may receive the current IN12 as a noise signal of the sensor pixel SP12.

The initialization signal (S[i]) is supplied with a disable-level voltage for the second period H12. The scan signal (G[i]) and the driving signals (E[1], ..., E[j], E[j+1], ..., E[n]) are supplied with enable-level voltages in the second period H12 in which the initialization signal (S[i]) is supplied with a disable-level voltage. Further, the switching signals (W[1], ..., W[j], W[+1], ..., W[n]) are supplied with an enable-level voltage in the second period H12 in which the scan signal (G[i]) and the driving signals (E[1], ..., E[j], E[j+1], ..., E[n]) are supplied with the enable-level voltages.

The scan signal (G[i]) turns on the third transistor TR3 of the sensor pixels SP11 and SP12, and the enable-level switching signals (W[j], W[j+1]) turn on the fifth transistor TR5 of the sensor pixels SP11 and SP12.

The currents ID11 and ID12 may flow according to the voltage at the control end of the second transistor TR2 (or the first node N1) and the common voltage (VCOM) that is applied to the first end of the second transistor TR2. The currents ID11 and ID12 may be transmitted to the sensing driver 31 through the respective sensing lines (Rj, Rj+1).

The operation of the sensor pixels in the second fingerprint sensing mode is similar to that of the method for driving the fingerprint sensor described with reference to FIG. 13, and no detailed description thereof will be provided.

The sensor pixels SP11, SP12, SP21, and SP22 shown in FIG. 17 further include a fourth transistor TR4, compared to the sensor pixel shown in FIG. 16.

The sensor pixel SP11 includes a first transistor TR1 for initializing a first node N1, a reference capacitor (Cref) that is connected to the first node N1 and the driving signal line, a second transistor TR2 for outputting a current to the sensing line according to the voltage at the first node N1, a third transistor TR3 for transmitting the current provided by the second transistor TR2, a fourth transistor TR4 for transmitting the common voltage (VCOM) to the second transistor TR2, a fifth transistor TR5 for transmitting the current provided by the third transistor TR3 to the sensing line (Rj), and a touch capacitor Cf coupled in parallel to the reference capacitor (Cref) at the first node N1, of which capacitance changes according to a touch.

The first transistor TR1 includes a first end connected to the initialization voltage line VL1, a second end connected to the first node N1, and a control end connected to the initialization line (Si).

The second transistor TR2 includes a first end connected to a second end of the fourth transistor TR4, a second end connected to a first end of the third transistor TR3, and a control end connected to the first node N1.

The third transistor TR3 includes the first end connected to the second end of the second transistor TR2, a second end connected to a first end of the fifth transistor TR5, and a control end connected to the scan line (Gi).

The fourth transistor TR4 includes a first end connected to the common voltage line VL2, the second end connected to the first end of the second transistor TR2, and a control end connected to the scan line (Gi).

The fifth transistor TR5 includes the first end connected to the second end of the third transistor TR3, a second end connected to the sensing line (Rj), and a control end connected to the switching line (Wj).

The reference capacitor (Cref) includes a first end connected to the first node N1 and a second end connected to the driving signal line (Ej).

The touch capacitor Cf includes one electrode connected to the first node N1, and changes the voltage at the first node N1 according to a user's touch.

The sensor pixels SP11, SP12, SP21, and SP22 respectively include a fifth transistor TR5 that is turned on according to the level of the switching signal.

The method for driving a fingerprint sensor including sensor pixels of FIG. 17 is similar to the method for driving a fingerprint sensor including sensor pixels of FIG. 16. However, each of the sensor pixels SP11, SP12, SP21, and SP22 further includes the fourth transistor TR4, thereby blocking the noise input by another sensor pixel through the common voltage line VL2.

While the present disclosure has been described in connection with what is presently considered to be exemplary embodiments, it is to be understood that the present disclosure is not limited to the disclosed embodiments, but, on the contrary, is intended to cover various modifications and equivalent arrangements included within the spirit and scope of the present disclosure.

What is claimed is:
1. A fingerprint sensor comprising:
  a plurality of scan lines; a plurality of driving signal lines; a plurality of sensing lines; a plurality of initialization lines; an initialization voltage line for supplying an initialization voltage; a common voltage line for supplying a common voltage; and a plurality of sensor pixels,
  wherein each of the sensor pixels includes:
  a reference capacitor including a first end connected to a driving signal line of the driving signal lines and a second end connected to a first node;
  a touch capacitor including one electrode connected to the first node, wherein capacitance of the touch capacitor changes by touching of an external object;
  a first transistor including a first end connected to the initialization voltage line, a second end connected to the first node, and a control end connected to an initialization line of the initialization lines;
  a second transistor including a first end for receiving the common voltage, a second end for outputting a current generated based on the common voltage, and a control end connected to the first node; and
  a third transistor including a first end connected to the second end of the second transistor, a second end connected to a sensing line of the sensing lines, and a control end connected to a scan line of the scan lines.

2. The fingerprint sensor of claim 1, further comprising:
a plurality of switching lines; and
a switching element including a first end connected to a sensing line of the sensing lines, a second end for transmitting the current, and a control end connected to a switching line of the switching lines.

3. The fingerprint sensor of claim 2, wherein
each of the sensor pixels further includes: a fourth transistor including a first end connected to the common voltage line; a second end connected to the first end of the second transistor; and a control end connected to the scan line.

4. The fingerprint sensor of claim 3, further comprising:
a scan driver for supplying a plurality of scan signals to the scan lines;
a sensing driver for supplying a plurality of driving signals to the driving signal lines, and receiving currents that are output by the sensor pixels through the plurality of sensing lines; and
a sensing controller for controlling the scan driver and the sensing driver to receive a first current from a first sensor pixel connected to a first scan line by supplying a first scan signal to the first scan line for a first period, and receive a second current from the first sensor pixel by supplying a second scan signal to the first scan line for a second period after the first period and supplying a driving signal to at least one of the driving signal lines.

5. The fingerprint sensor of claim 4, wherein
the scan driver further supplies a plurality of initialization signals to the initialization lines, and
the sensing controller supplies the initialization voltage to the first sensor pixel by supplying the initialization signal to one of the initialization lines for the first period.

6. The fingerprint sensor of claim 5, wherein
the sensing controller controls the sensing driver to supply an enable-level voltage to at least one of the switching lines for the first period and the second period.

7. The fingerprint sensor of claim 4, wherein
the sensing driver subtracts the first current from the second current, and outputs a resultant value to the sensing controller as sensing data.

8. The fingerprint sensor of claim 4, wherein
the sensing driver outputs the first current to the sensing controller as first sensing data corresponding to a noise signal, and the second current as second sensing data, and
the sensing controller generates a value from the second sensing data by subtracting the first sensing data.

9. The fingerprint sensor of claim 1, further comprising a plurality of switching lines,
wherein the sensor pixel further includes a fifth transistor including a first end connected to the second end of the third transistor, a second end connected to the sensing line, and a control end connected to a switching line of the switching lines.

10. A method for driving a fingerprint sensor including a plurality of scan lines, a plurality of driving signal lines, a plurality of sensing lines, a common voltage line for supplying a common voltage, and each of a plurality of sensor pixels being connected to a scan line of the scan lines, a driving signal line of the driving signal lines, a sensing line of the sensing lines, and the common voltage line, and outputting a current generated based on the common voltage to the sensing line while a scan signal is supplied from the scan line, the method for driving the fingerprint sensor comprising:
receiving a first current from a first sensor pixel connected to the scan line by supplying a first scan signal to the scan line of the scan lines for a first period; and
receiving a second current from the first sensor pixel by supplying a second scan signal to the scan line and supplying a driving signal to at least one driving signal line of the driving signal lines for a second period after the first period.

11. The method of claim 10, wherein
the fingerprint sensor further includes a plurality of initialization lines connected to the sensor pixels and an initialization voltage line for supplying an initialization voltage to the sensor pixels, and
the receiving of the first current includes:
supplying the initialization voltage to the first sensor pixel by supplying an initialization signal to one of the initialization lines for the first period.

12. The method of claim 11, wherein
the fingerprint sensor further includes a plurality of switching elements, wherein each of the switching elements includes a first end connected to a sensing line of the sensing lines, a second end connected to the sensing driver, and a control end connected to a switching line to which a switching signal from the sensing driver is applied, and
wherein the receiving of the first current and the receiving of the second current further respectively include supplying an enable-level voltage to at least one of the switching lines.

13. The method of claim 11, wherein
the fingerprint sensor further includes switching elements, wherein each of the switching elements includes a first end connected to the sensing line of the sensing lines, a second end connected to the sensing driver, and a control end connected to a switching line to which a switching signal from the sensing driver is applied, and
the receiving of the first current and the receiving of the second current respectively include supplying an enable-level voltage to one of the switching lines.

14. The method of claim 13, further comprising:
after receiving the second current, subtracting the first current from the second current and outputting a resultant current as sensing data.

15. The method of claim 13, further comprising:
after receiving the first current, outputting the first current as first sensing data corresponding to a noise signal, and
after receiving the second current, outputting the second current as second sensing data.

16. The method of claim 15, further comprising:
outputting a value from the second sensing data by subtracting the first sensing data.

17. A sensor pixel comprising:
a reference capacitor including a first end connected to a driving signal line and a second end connected to a first node;
a touch capacitor including one electrode connected to the first node, wherein capacitance of the touch capacitor changes by touching of an external object;
a first transistor including a first end connected to an initialization voltage line, a second end connected to the first node, and a control end connected to an initialization line;
a second transistor including a first end for receiving a common voltage, a second end for outputting a current generated based on the common voltage, and a control end connected to the first node; and a third transistor including a first end connected to the second end of the second transistor, a second end connected to a sensing line, and a control end connected to a scan line.

18. The sensor pixel of claim 17, further comprising:

a fourth transistor including a first end connected to a common voltage line for supplying the common voltage, a second end connected to the first end of the second transistor, and a control end connected to the scan line.

19. The sensor pixel of claim 17, further comprising:

a fifth transistor including a first end connected to the second end of the third transistor, a second end connected to the sensing line, and a control end connected to a switching line.

* * * * *